(12) United States Patent
Hasebe et al.

(10) Patent No.: US 10,363,658 B2
(45) Date of Patent: Jul. 30, 2019

(54) ANGLE DETECTION METHOD, ANGLE DETECTION APPARATUS, ROTATION DRIVE APPARATUS, ROBOT APPARATUS, AND STORAGE MEDIUM

(71) Applicant: CANON KABUSHIKI KAISHA, Tokyo (JP)

(72) Inventors: Satoshi Hasebe, Hiratsuka (JP); Yohji Nakajima, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/667,487

(22) Filed: Mar. 24, 2015

(65) Prior Publication Data

US 2015/0276436 A1 Oct. 1, 2015

(30) Foreign Application Priority Data

Mar. 27, 2014 (JP) .................. 2014-067097

(51) Int. Cl.
| | |
|---|---|
| *H02P 6/16* | (2016.01) |
| *B25J 9/12* | (2006.01) |
| *G01D 5/244* | (2006.01) |
| *B25J 13/08* | (2006.01) |
| *H02K 11/22* | (2016.01) |

(52) U.S. Cl.
CPC ............. *B25J 9/126* (2013.01); *B25J 13/088* (2013.01); *G01D 5/2449* (2013.01); *G01D 5/24485* (2013.01); *H02K 11/22* (2016.01); *Y10S 901/23* (2013.01); *Y10S 901/46* (2013.01); *Y10T 74/20317* (2015.01)

(58) Field of Classification Search
CPC .............................. B25J 9/06; B25J 15/0019
See application file for complete search history.

(56) References Cited

U.S. PATENT DOCUMENTS

| 9,134,143 | B2* | 9/2015 | Shibata | ............. G01D 5/24466 |
| 2007/0163136 | A1* | 7/2007 | Eaton | .................. G01B 5/004 |
| | | | | 33/505 |
| 2011/0202308 | A1* | 8/2011 | Kishida | .................. G01B 7/30 |
| | | | | 702/151 |

FOREIGN PATENT DOCUMENTS

JP 2012-137310 A 7/2012

* cited by examiner

*Primary Examiner* — Bickey Dhakal
*Assistant Examiner* — Charles S Laughlin
(74) *Attorney, Agent, or Firm* — Canon U.S.A., Inc. IP Division

(57) ABSTRACT

To provide an angle detection method with which a control for positioning an output shaft using an input shaft encoder and output shaft encoder at a high accuracy and a torsional feedback control can be realized and an angle detection apparatus that executes the angle detection method. In a robot arm constituted by an input shaft encoder, an output shaft encoder, a motor, a reduction gear, and the like, an output shaft encoder detection error is corrected by setting rotation position information using a periodicity of rotations of the input shaft encoder as a reference. When the input/output shaft encoder detection error is corrected in this manner, the control for positioning the output shaft at a high accuracy and the torsional feedback control can be realized.

16 Claims, 23 Drawing Sheets

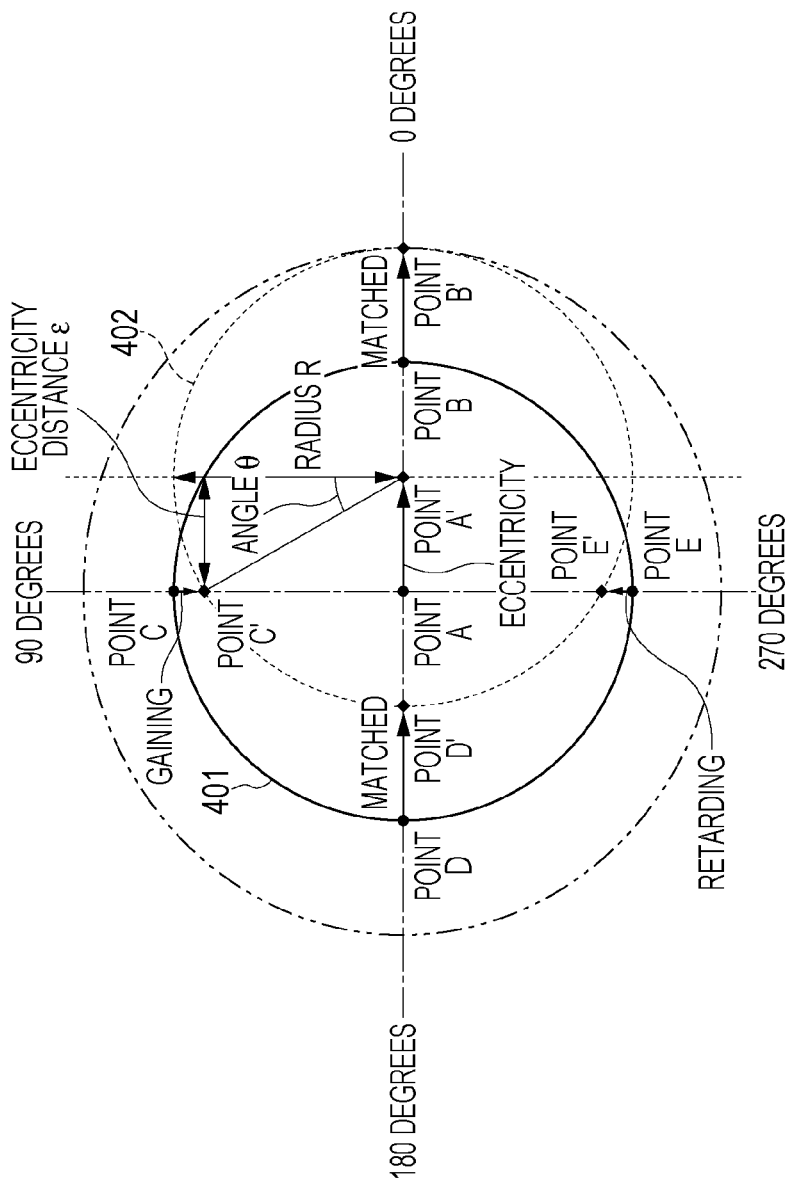

FIG. 7
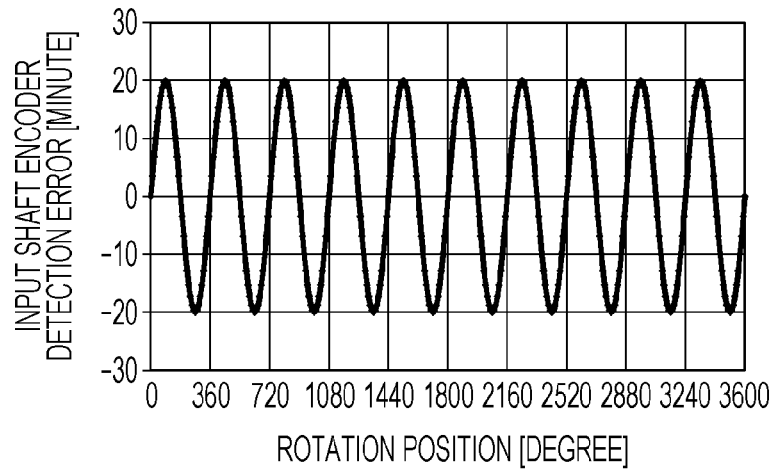
REDUCTION GEAR RATIO 10:1
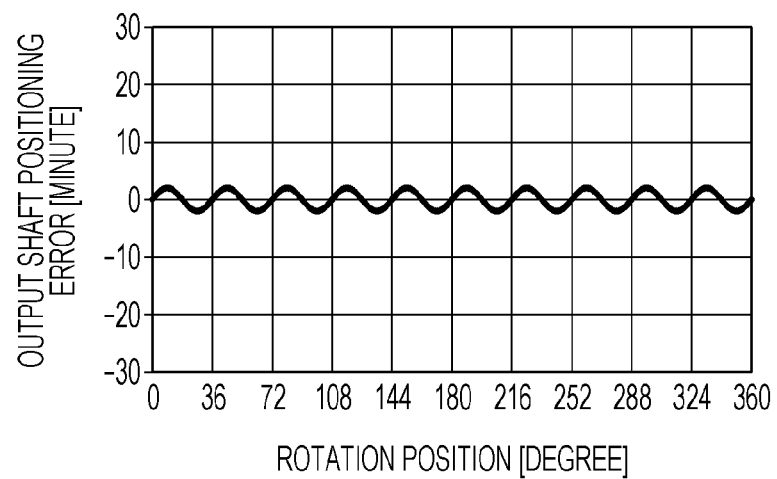

FIG. 10
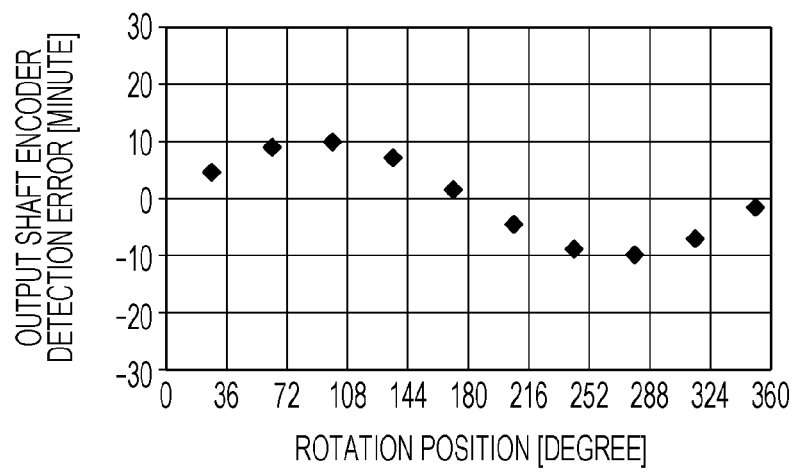
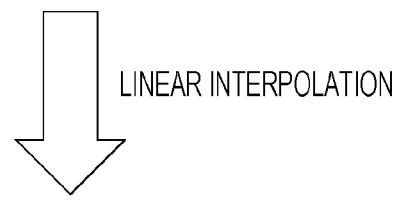
LINEAR INTERPOLATION
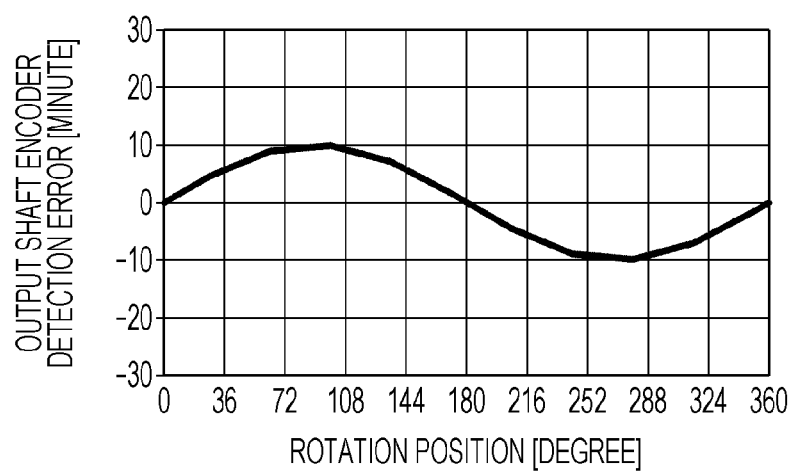

FIG. 11
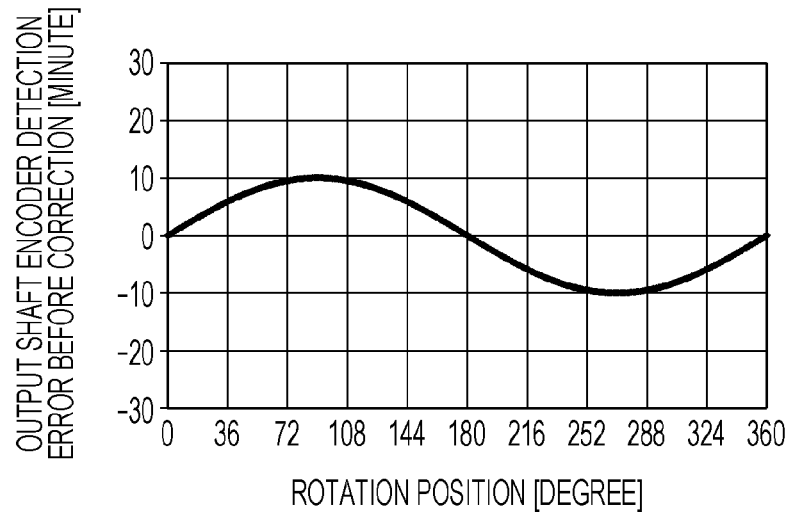
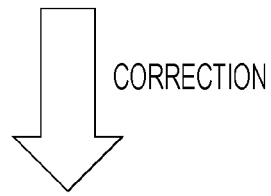
CORRECTION
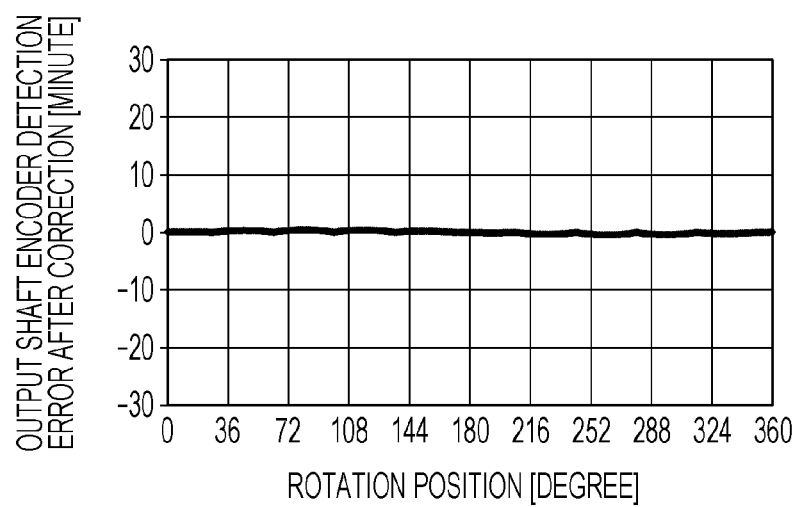

FIG. 12
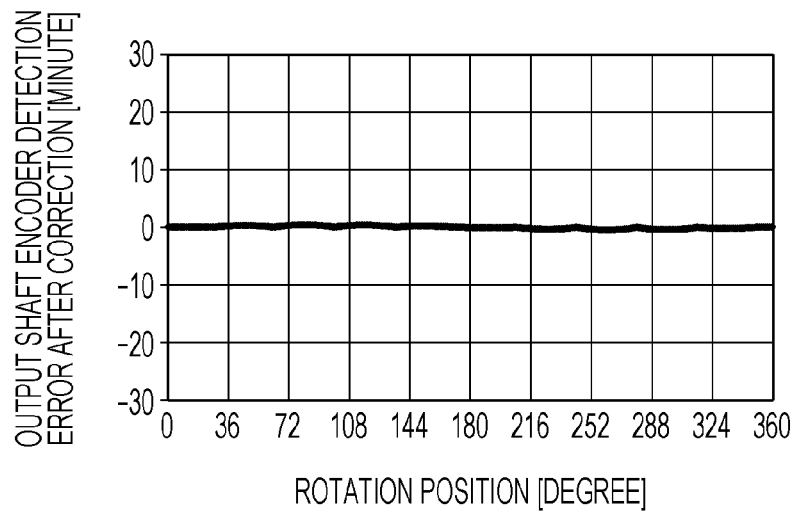
REDUCTION GEAR RATIO 10:1
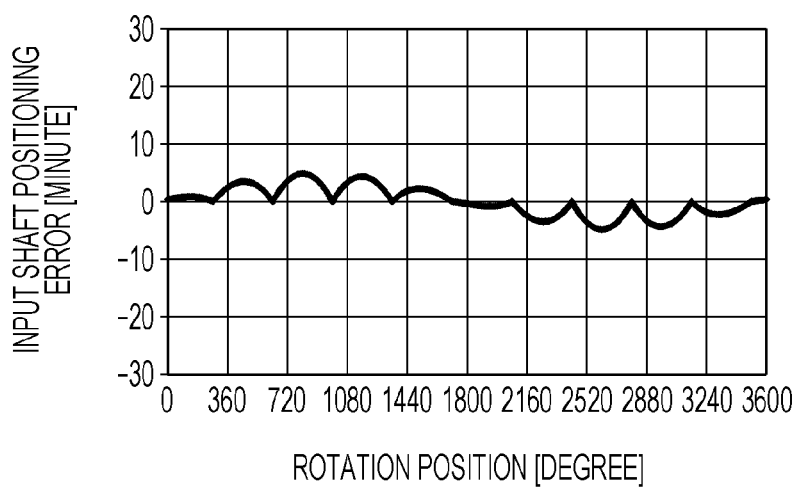

FIG. 14
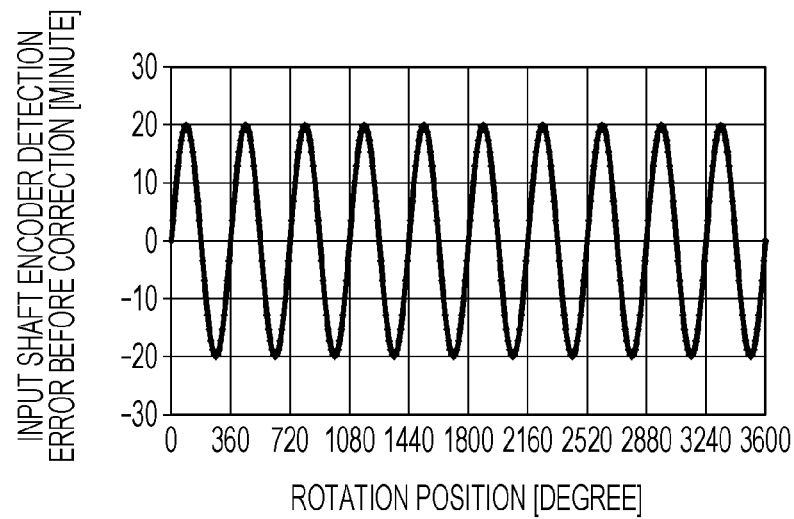
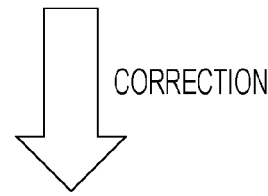
CORRECTION
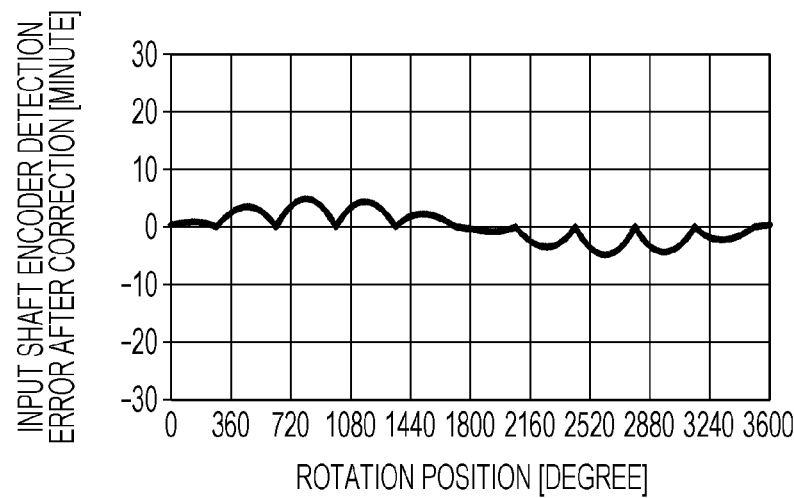

FIG. 15

| CONDITION | REDUCTION GEAR RATIO | OUTPUT SHAFT ENCODER DETECTION ERROR | INPUT SHAFT ENCODER DETECTION ERROR | SOLVING METHOD | OUTPUT SHAFT ENCODER DETECTION ERROR AFTER (CORRECTION) | OUTPUT SHAFT ENCODER CORRECTION EFFECT | INPUT SHAFT ENCODER DETECTION ERROR AFTER (CORRECTION) | INPUT SHAFT ENCODER CORRECTION EFFECT |
|---|---|---|---|---|---|---|---|---|
| A | 10:1 | ±10 MINUTES | ±20 MINUTES | PRESENT INVENTION | ±0.48 MINUTES | 95.2% | ±4.83 MINUTES | 75.9% |
| | | | | RELATED ART TECHNOLOGY | ±2.00 MINUTES | 80.0% | ±20.00 MINUTES | 0.00% |
| B | 50:1 | ±10 MINUTES | ±20 MINUTES | PRESENT INVENTION | ±0.02 MINUTES | 99.8% | ±0.99 MINUTES | 95.1% |
| | | | | RELATED ART TECHNOLOGY | ±0.40 MINUTES | 96.0% | ±20.00 MINUTES | 0.00% |
| C | 50:1 | ±5 MINUTES | ±20 MINUTES | PRESENT INVENTION | ±0.01 MINUTES | 99.8% | ±0.49 MINUTES | 98.0% |
| | | | | RELATED ART TECHNOLOGY | ±0.40 MINUTES | 92.0% | ±20.00 MINUTES | 0.00% |

FIG. 21
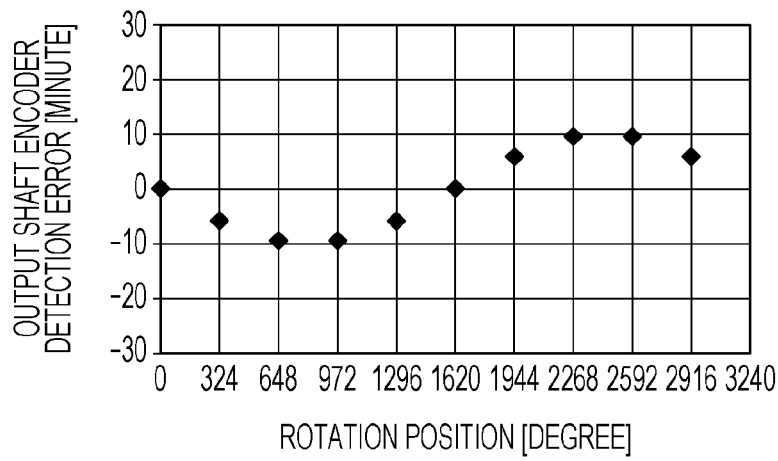
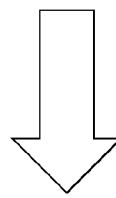
SINE WAVE ESTIMATION INTERPOLATION
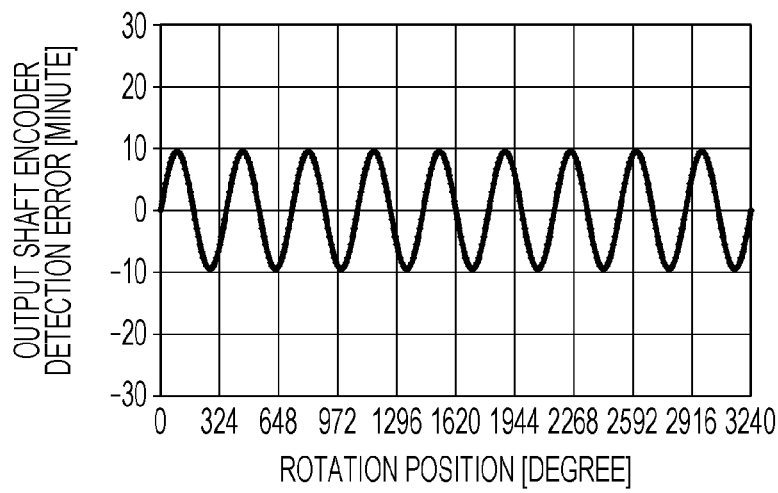

FIG. 22
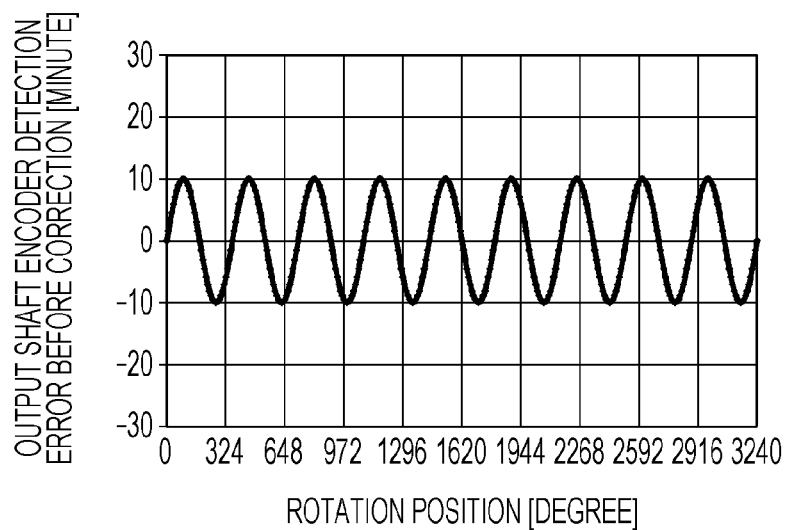
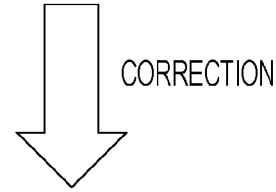
CORRECTION
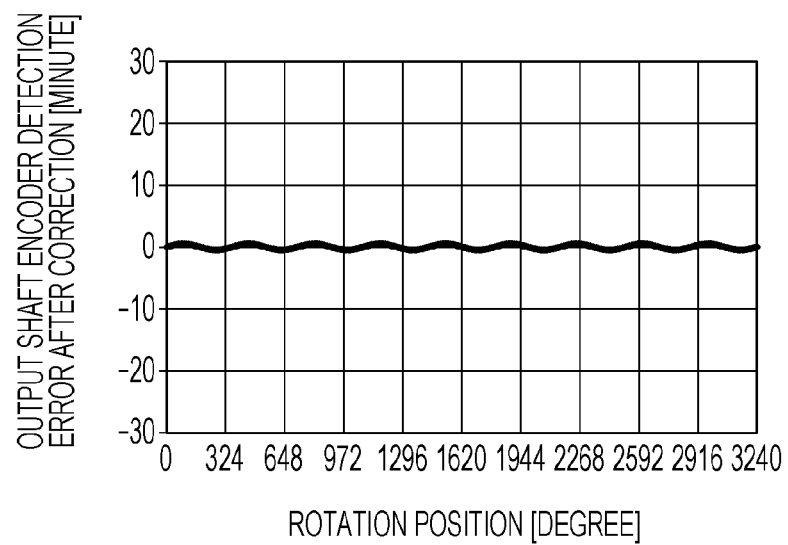

ANGLE DETECTION METHOD, ANGLE DETECTION APPARATUS, ROTATION DRIVE APPARATUS, ROBOT APPARATUS, AND STORAGE MEDIUM

BACKGROUND OF THE INVENTION

Field of the Invention

The present invention relates to a method of correcting an encoder detection error caused by an eccentricity between a shaft and a rotating disc.

Description of the Related Art

Up to now, a robot arm includes a rotation drive apparatus constituted by a servo motor (hereinafter, will be referred to as motor) which is configured to drive an articulating mechanism and a reduction gear configured to obtain a high output torque. The rotation drive apparatus is provided with a rotary encoder (hereinafter, will be referred to as encoder) which is configured to detect an angle of a rotator. The encoder is directly connected to a rotation shaft of the motor and controls a tip position of a robot arm by feeding back information of the rotation angle detected by the encoder to the motor.

In recent years, since demands for an industrial robot that can assembly high-precision parts have been increased, a higher accuracy for the control on the tip position of the robot arm has also been requested. Degradation factors of a positioning accuracy for the tip position of the robot arm include an angle transmission error or a torsion of the reduction gear in the rotation drive apparatus of the robot arm, an encoder detection error, and the like. This encoder detection error refers to an error derived from a deviation based on an eccentricity when a shaft of the encoder and a rotating disc are mounted with respect to ideal positions.

First, an internal structure of the encoder will be described by using FIG. 3. In FIG. 3, an encoder 301 includes a rotating disc 302 that is fixed to a shaft 303, on which a transmission part and a non-transmission part are regularly aligned in a circumferential direction as rotating disc patterns. Furthermore, the encoder 301 is constituted by a fixed slit 305, a light emitting element 304, and a light receiving element 306 which are fixed in positions with respect to a casing of the encoder 301 and arranged so as to face the rotating disc 302.

The shaft 303 is connected to a rotation shaft where a user desires to detect a rotation angle (in the following discussion, which may be referred to as "input shaft" in the sense of an input to the reduction gear). While the input shaft and the shaft 303 are connected to each other and integrally rotate, the rotation angle of the input shaft can be detected by the encoder 301.

This encoder is a general transmission-type optical system absolute encoder. When light from the light emitting element 304 is input to the rotating disc 302, the light receiving element 306 repeats reception and non-reception of the light via the fixed slit 305 to be detected as on/off electric signals and calculates the rotation position.

The encoder is mounted to a rotator such as a shaft core of the motor or the like and realizes a highly accurate rotation position control in the rotation drive apparatus of the robot arm. As will be described step by step, if an eccentricity exists between the rotation center of the rotating disc 302 and the shaft 303, the encoder detection error caused by this eccentricity affects this highly accurate rotation position control in a non-negligible manner.

Meanwhile, with regard to a device configured to convert the rotation of the motor such as the robot arm into a torque via the reduction gear to perform the drive, a technique of providing an encoder to an output shaft of the reduction gear (hereinafter, may be referred to as "output shaft" in some cases) has been proposed. This technique is used for performing a control for positioning the output shaft at a high accuracy or a torsional feedback control for detecting a torsion in proportion to the torque of the reduction gear. This torsional feedback control is performed to address a problem that, even when the rotation shaft of the motor (input shaft) is controlled such that the rotation position is at a set rotation angle, the output shaft is not controlled to be at the target rotation angle since a torsional rigidity of the reduction gear itself is not necessarily high.

For example, Japanese Patent Laid-Open No. 2012-137310 describes a method of executing this torsional feedback control. As described in Japanese Patent Laid-Open No. 2012-137310, a rotation drive apparatus of a robot arm constituted by an input shaft encoder that detects a rotation angle of the motor, an output shaft encoder that detects a rotation angle of a rotator on an output side of the reduction gear, a motor, a reduction gear, and the like has been proposed.

However, according to the torsional feedback control, a difference between rotation position information of the output shaft encoder and rotation position information of the input shaft encoder is detected as a torsion amount, and the torsion amount is fed back to the motor to perform the control. Therefore, this is effective in the correction of the angle transmission error of the reduction gear in the rotation drive apparatus but is not the technology to address the degradation in the positioning accuracy which is caused because of the encoder detection error.

For that reason, if the encoder detection error caused by the eccentricity between the rotating center of the rotating disc and the shaft occurs in the encoder itself in the first place, it is difficult to detect the accurate rotation angle of the rotation drive apparatus. Since this encoder detection error exists, even when the technique described in Japanese Patent Laid-Open No. 2012-137310 is used in the device that utilizes the reduction gear such as the robot arm, limitations exist when the control for positioning the output shaft at a high accuracy and the torsional feedback control are performed.

For example, when an attempt is made to correct the rotation position from the output value of the output shaft encoder without addressing the problem of the encoder detection error of the input shaft encoder, an encoder involving a small encoder detection error is to be provided to the output shaft. This is because an error amount obtained by multiplying the input shaft encoder detection error by a reduction gear ratio of the reduction gear is generated as the positioning error of the output shaft.

In general, since the encoder involving the small encoder detection error is extremely expensive, it is not necessarily practical to provide the encoder to the input/output shaft of the robot arm.

That is, according to this related art method, the encoder detection error of the encoder arranged in the rotation drive apparatus is not sufficiently taken into account. For that reason, a problem occurs that it is practically difficult to perform the control for positioning the output shaft at a high accuracy and the torsional feedback control to improve the accuracy for positioning the tip position of the robot arm.

SUMMARY OF THE INVENTION

The present invention has been made to address the above-described problem and provides an angle detection method with which a control for positioning an output shaft at a high accuracy by using an input shaft encoder and an output shaft encoder and a torsional feedback control can be realized, and an angle detection apparatus that executes the angle detection method.

According to an aspect of the present invention, there is provided an angle detection method performed by an angle detection apparatus provided with a first shaft, a power transmission unit, and a second shaft which are connected in succession, and also provided with a first encoder and a second encoder that respectively detect rotation angles of the first shaft and the second shaft, the angle detection method including:

detecting a first rotation angle of the first shaft and a second rotation angle of the second shaft;

collecting a second rotation angle group detected by the second encoder respectively corresponding to a first rotation angle group collected for every periodic angles from among the rotation angles detected by the first encoder;

creating a correction table generated on the basis of the second rotation angle group; and correcting the second rotation angle on the basis of the correction table.

Further features of the present invention will become apparent from the following description of exemplary embodiments with reference to the attached drawings.

BRIEF DESCRIPTION OF THE DRAWINGS

FIG. 4 illustrates a relationship between an eccentricity and an encoder detection error.

FIG. 7 illustrates an output shaft positioning error caused by an input shaft encoder detection error.

FIG. 10 illustrates a linear interpolation for sampling data of the output shaft encoder detection error.

FIG. 11 illustrates a correction output shaft encoder detection error after a correction.

FIG. 12 illustrates an input shaft positioning error caused by the correction output shaft encoder detection error after the correction.

FIG. 14 illustrates an input shaft encoder detection error after the correction.

FIG. 15 illustrates correction simulation results for comparing the present invention with a related art technology.

FIG. 21 illustrates a sine wave estimation interpolation for the sampling data of the output shaft encoder detection error according to the fifth exemplary embodiment.

FIG. 22 illustrates the correction output shaft encoder detection error after the correction according to the fifth exemplary embodiment.

DESCRIPTION OF THE EMBODIMENTS

Figure 1A:
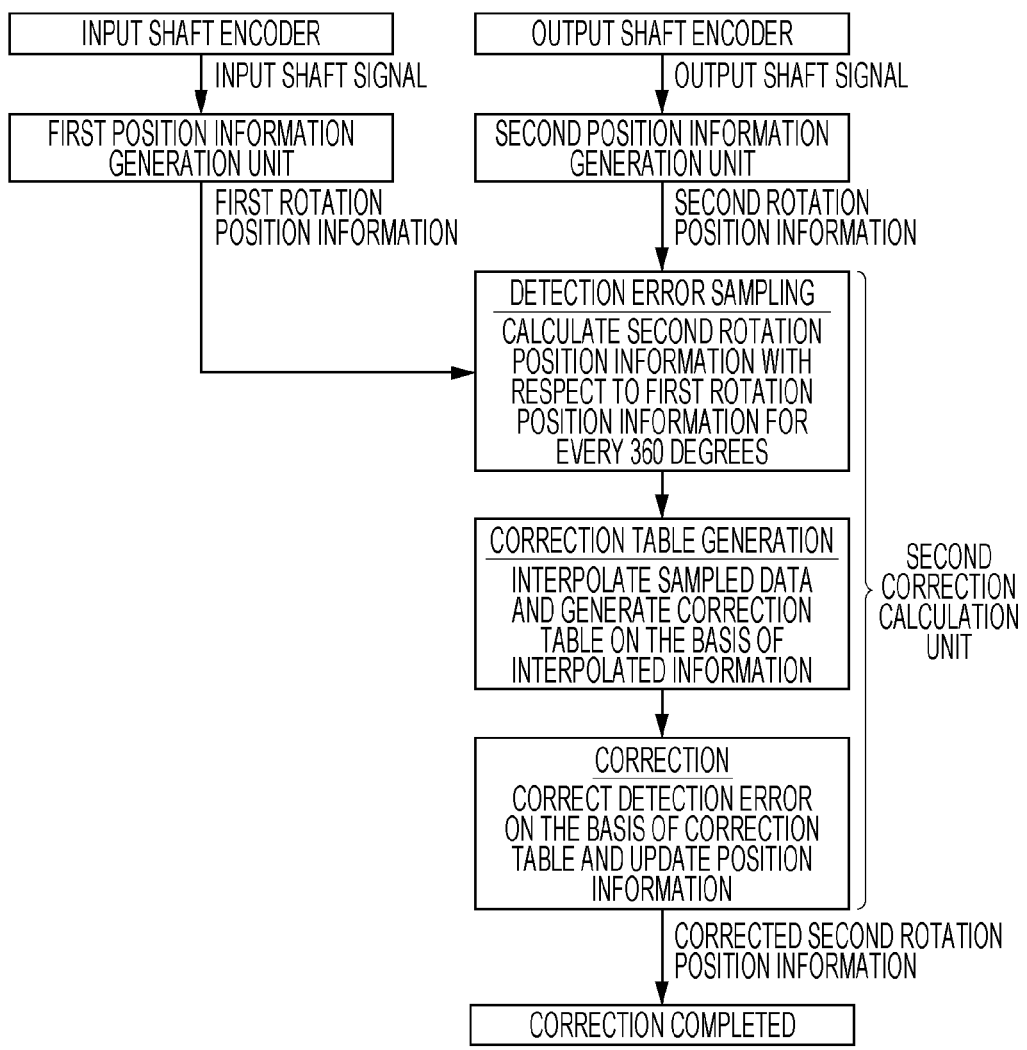
FIGS. 1A and 1B are flow charts of an angle detection method.

Hereinafter, to describe exemplary embodiments and examples according to the present invention, first, an eccentricity related to a shaft 303 and a rotating disc 302 of an encoder 301 and an encoder detection error will be quantitatively described.

FIG. 4 illustrates a relationship between the eccentricity and the encoder detection error. The eccentricity described herein refers to a deviation between a center point of the shaft 303 of the encoder 301 and a center point of the rotating disc 302. In FIG. 4, a rotating disc pattern 401 indicates encoder position information, and a rotating disc pattern 402 indicates a situation in which the rotating disc pattern 401 is decentered with respect to a point A where the shaft 303 exists by an eccentricity distance ε.

The above-described eccentricity is caused when the rotating disc and the shaft are mounted, for example. In FIG. 4, for facilitating the descriptions, the size of the eccentricity is emphasized to be drawn with respect to the radius of the circle drawn by the rotating disc pattern.

FIG. 4 illustrates a situation in which the center of the rotating disc pattern is decentered to a point A' from the point A where the shaft 303 exists while the direction is set as 0 degrees corresponding to a reference angle, and a left rotation is set as a positive rotation.

A circle drawn by a chain double-dashed line indicates an envelope when the eccentric rotating disc pattern rotates around the point A where the shaft 303 exists which is set as the center. The rotating disc pattern rotates and moves inside this chain double-dashed line circle in accordance with the size of the eccentricity distance ε. Of course, in a case where the eccentricity distance ε is zero, this chain double-dashed line circle is matched with a circle having a radius R where the point A is set as the center in FIG. 4.

An axis in the eccentric direction and an axis perpendicularly intersecting with the eccentric direction, that is, the axis from 0 degrees to 180 degrees and the axis from 90 degrees to 270 degrees indicate an ideal encoder detection position. The point A corresponds to the center point of the shaft 303, that is, the center point of the rotating disc pattern 401, and the point A' corresponds to the center point of the rotating disc pattern 402 at the time of the eccentricity. A point B, a point C, a point D, and a point E respectively indicate position information of the rotating disc pattern 401 at 0 degrees, 90 degrees, 180 degrees, and 270 degrees. A point B', a point C', a point D', and a point E' respectively indicate encoder detection position information at the time of the eccentricity. First, with regard to the detection error of the shaft in the eccentric direction, that is, while the point A in FIG. 4 is set as an origin, the detections are performed in the positions at 0 degrees and 180 degrees respectively at the point B and the point B' and at the point D and the point D', and therefore the encoder detection error caused by the eccentricity is not substantially generated.

In contrast to this, with regard to the detection error on the axis perpendicularly intersecting with the eccentric direction, when the point C and the point C' are compared with each other, the point C' is detected as a position gaining with respect to the point C. When the point E and the point E' are compared with each other, the point E' is detected as a position retarding with respect to the point E. Thus, the encoder detection error caused by the eccentricity is generated. Herein, in a case where an encoder detection error is set as θ [rad], an eccentricity distance is set as ε, and a radius of the rotating disc pattern 401 is set as R, the encoder detection error θ [rad] is represented by a relational expression (1).

$$\theta = \sin^{-1}(\varepsilon/R) \quad (1)$$

That is, since the encoder detection error θ [rad] based on this relational expression (1) appears, a deviation with respect to the ideal position occurs.

Figure 5A:
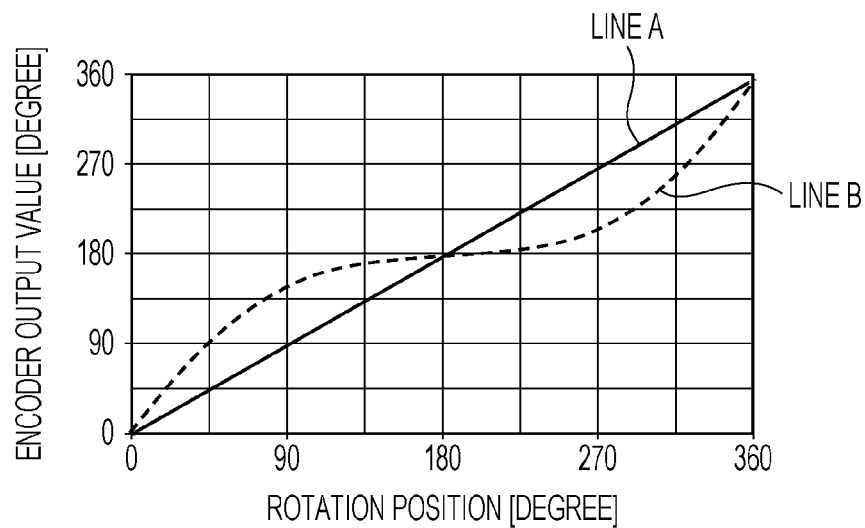
FIGS. 5A and 5B illustrate a relationship between an encoder output value and an encoder detection error caused by the eccentricity.
Figure 5B:
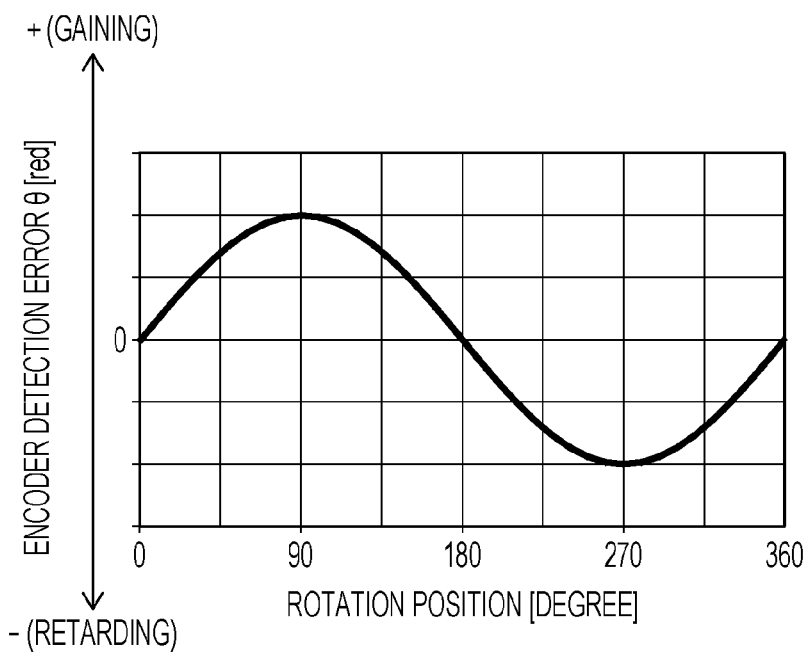

FIGS. 5A and 5B illustrate a relationship between an encoder output value of the encoder involving the eccentricity and an encoder detection error. In FIG. 5A, a line A represents an encoder output value when no eccentricity exists, and a line B represents an encoder output value when an eccentricity exists. That is, a difference amount between the encoder output value of the line B and the encoder output value of the line A corresponds to an encoder detection error caused by the eccentricity, and this encoder detection error is represented by FIG. 5B. Since a relationship between the encoder eccentricity and the encoder detection error is represented by a sine function, when the shaft 303 of the encoder 301 makes one rotation (360 degrees), a sinusoidal encoder detection error is caused by an amount corresponding to one period, and when the shaft 303 of the encoder 301 makes two rotations (720 degrees), the sinusoidal encoder detection error is caused by an amount corresponding to two periods. That is, when the shaft 303 of the encoder 301 makes N rotations (360×N degrees), the sinusoidal encoder detection error appears by an amount corresponding to N periods. Since the above-described encoder detection error exists, the accuracy for positioning the tip position of the robot arm is deteriorated. Therefore, this problem is addressed by the following configuration.

The error based on the deviation between the center of the shaft 303 and the center of the rotating disc 302 at the time of the mounting of the encoder 301 and the rotating disc 302 has been described as the detection error, but the cause of the error is not limited to this. For example, the cause may also include a detection error between an input shaft 205 and an output shaft 206. That is, the detection error between the input shaft 205 and the output shaft 206 is also caused by the eccentricity between the input shaft 205 and the output shaft 206. This error is generated when the rotation is performed because of a rigidity of the shaft member, an engagement accuracy, a load, or the like even after an attempt has been made to assemble these shafts to each other at a high accuracy. That is, if the error is a sinusoidal error indicating a positional reproducibility when the shaft 303 makes one rotation as the detection error, the following exemplary embodiments of the present invention can be carried out.

First Exemplary Embodiment

Figure 2A:
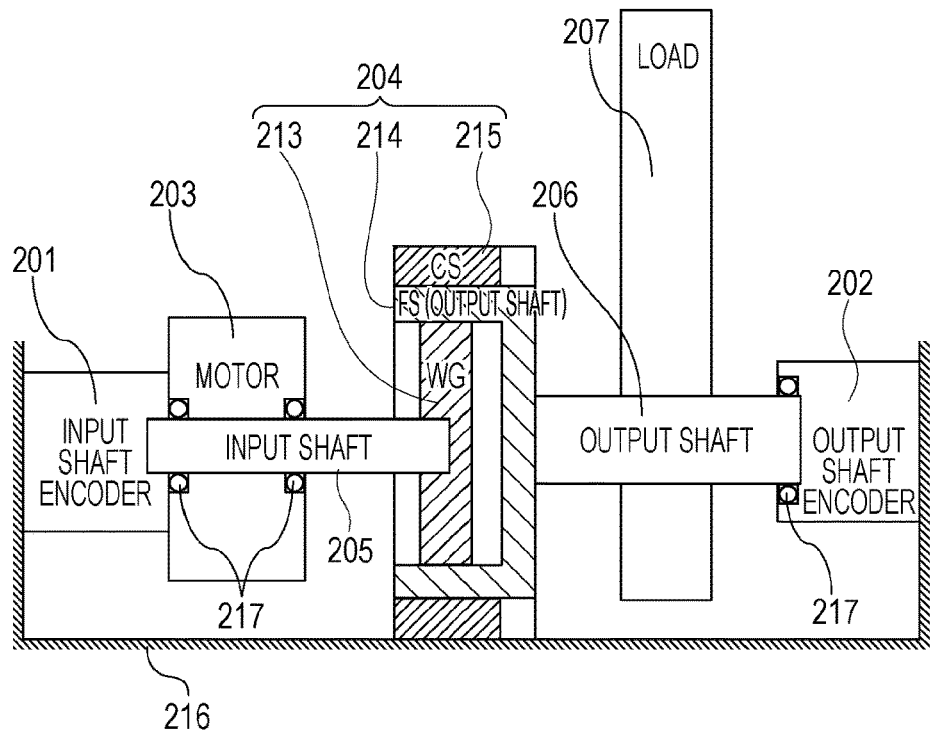
FIG. 2A is a cross sectional view of a rotation drive apparatus.
Figure 2B:
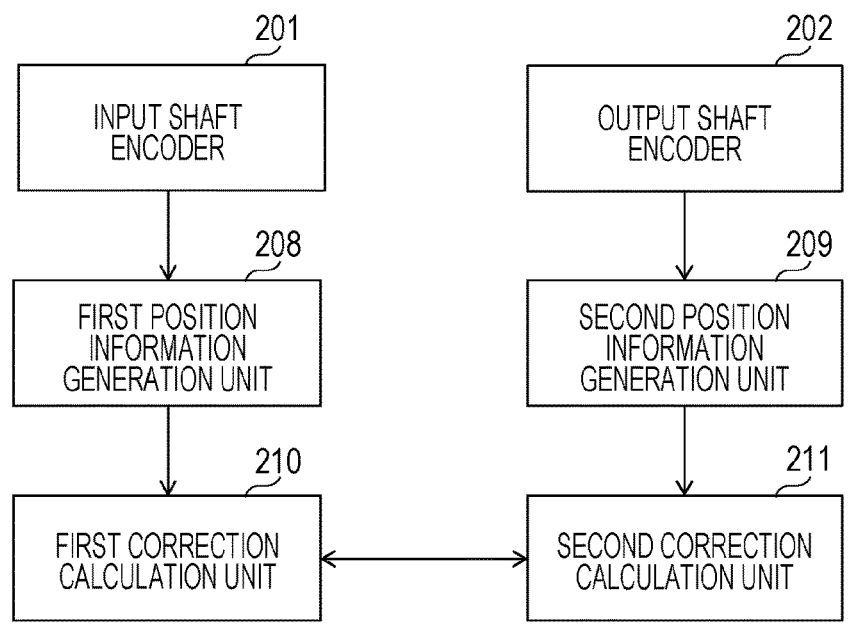
FIG. 2B illustrates a signal flow.

FIGS. 2A and 2B are drawings that effectively represent characteristics of the present invention. FIG. 2A is a cross sectional view of a rotation drive apparatus provided with an angle detection apparatus according to an exemplary embodiment of the present invention, and FIG. 2B illustrates a signal flow. In FIG. 2A, a motor 203 rotates the input shaft 205 that corresponds to a first rotation shaft. A reduction gear 204 functioning as a power transmission unit performs speed reduction in accordance with the rotation of the input shaft 205 at a previously set reduction gear ratio, for example, 10:1, and rotates the output shaft 206 that corresponds to a second shaft. That is, while the motor 203 rotates the input shaft 205, and the input shaft 205 is rotated, the output shaft 206 is rotated via the reduction gear 204.

Here, the reduction gear 204 will be described. While a wave generator (WG) 213 configured to generate waves and coupled to the input shaft 205 rotates, a flexible spline (FS) 214 corresponding to an external gear is bent into an elliptic shape and engaged with a circular spline (CS) 215 corresponding to an internal gear in both end positions in a long-axis direction of an ellipse in the flexible spline (FS) 214. At this time, a relative rotation is generated between the flexible spline (FS) 214 and the circular spline (CS) 215, and a torque where substantial speed reduction has been performed is transmitted from the flexible spline (FS) 214 to the output shaft to be output. According to the present exemplary embodiment, the reduction gear 204 using the wave gear has been described, but the configuration is not limited to this.

An input shaft encoder 201 detects an input shaft signal in accordance with the rotation position of the input shaft 205 which is rotated by the motor 203. An output shaft encoder 202 outputs an output shaft signal in accordance with the rotation position of the output shaft 206 coupled the input shaft 205 via the reduction gear 204. That is, the input shaft encoder 201 has a function of detecting a rotation angle of the input shaft while a shaft core of the input shaft 205 of the motor 203 is set as the center and can detect where the input shaft 205 is located among a mechanical angle of 360 degrees. In contrast to this, the output shaft encoder 202 has a function of detecting a rotation angle in the rotation of the output shaft 206 connected via the reduction gear from the input shaft 205 of the motor 203 and can detect where the output shaft 206 is located among a mechanical angle of 360 degrees.

In this manner, a first shaft, a power transmission unit, and a second shaft are connected to each other in succession and constitute an angle detection apparatus provided with a first encoder and a second encoder that respectively detect rotation angles of the first shaft and the second shaft. The motor 203 and this angle detection apparatus constitute the rotation drive apparatus.

Figure 3:
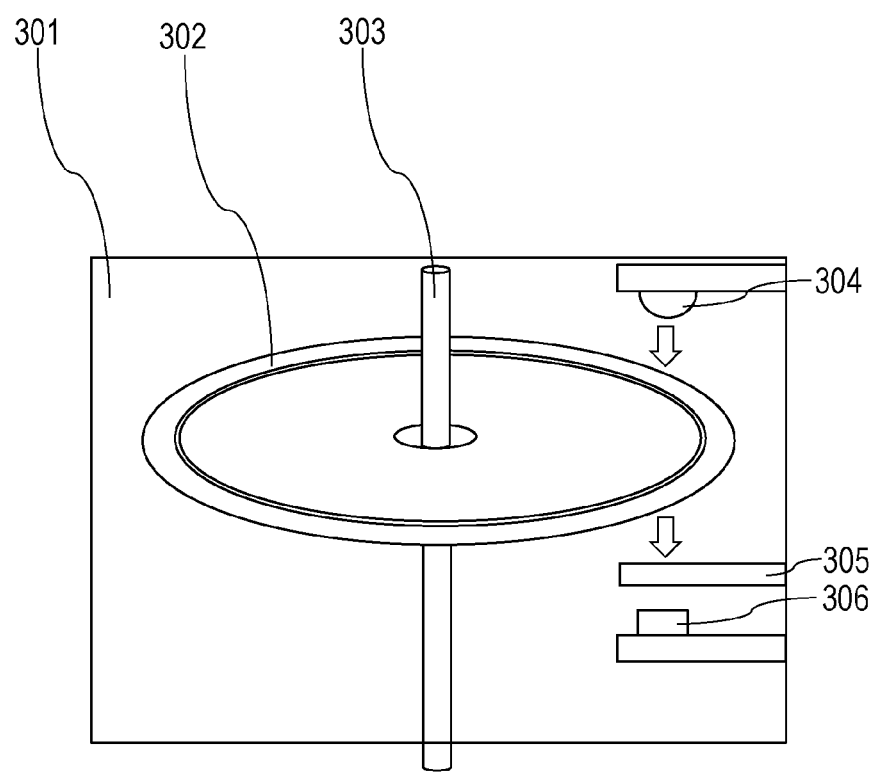
FIG. 3 illustrates an internal structure of the encoder.

As described above by using FIG. 3, the transmission-type optical system absolute encoder has been described as the input/output shaft encoder, the encoders 301 of various types including a reflection type, a magnetic type, an incremental type, and the like may be combined with each other to be used. Furthermore, since a similar advantage can be attained when an angle detector such as a resolver is provided instead of the encoder 301, the configuration can be applied to respective exemplary embodiments including the present exemplary embodiment.

The output shaft 206 is normally connected to a load 207 and provided with a first position information generation unit 208 and a first correction calculation unit 210 which will be described below on the input shaft encoder 201 side. The output shaft 206 is further provided with a calculation unit constituted by a second position information generation unit 209, a second correction calculation unit 211, and the like which will be described below on the output shaft encoder 202 side.

In a case where the robot arm, for example, is driven by the rotation drive apparatus, the load is equivalent to a link or the like in the robot arm, and the reduction gear ratio of the reduction gear or the specification of the motor is selected by the user in accordance with the size of the load.

The present invention is different from the related art technology in the following point. That is, the output shaft encoder detection error is corrected by using the periodicity of rotations of the input shaft encoder 201, for example, while periodic rotation position information of the input shaft encoder 201 for every 360 degrees is set as a reference.

The present invention will be specifically described. FIG. 1A is a flow chart illustrating exchanges of signals and information in the angle detection method according to the present exemplary embodiment. First, the input shaft signal from the input shaft encoder 201 is received by the first position information generation unit 208, and similarly, the output shaft signal from the output shaft encoder 202 is received by the second position information generation unit 209. Next, first rotation position information corresponding to a first rotation angle which is output from the first position information generation unit 208 and second rotation position information corresponding to a second rotation angle which is output from the second position information generation unit 209 are input to the second correction calculation unit 211.

In the second correction calculation unit 211, first, sampling of the detection error in the output shaft encoder (second encoder) is performed. For that sampling, the second rotation position information (second rotation angle group) with respect to the first rotation position information (first rotation angle group) for every 360 degrees of the input shaft encoder 201 (first encoder) is calculated.

That is, data of the first rotation angle group is regularly and also discretely collected from first rotation angle data and corresponds to a subset of the entire first rotation angle data.

In the same manner, data of the second rotation angle group corresponds to a subset of the entire second rotation angle data.

Figure 9:
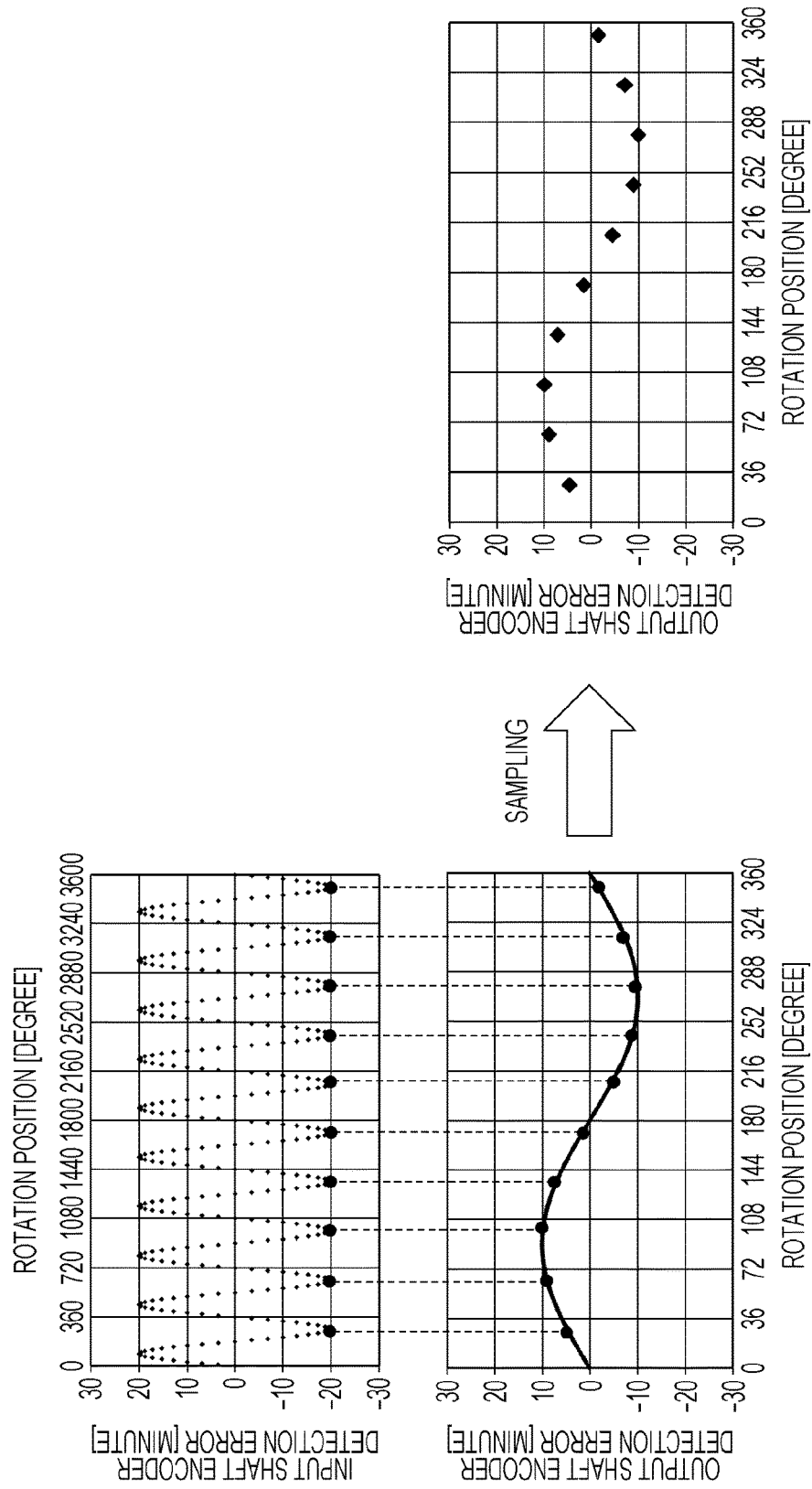
FIG. 9 illustrates a sampling method for an output shaft encoder detection error.

FIG. 9 illustrates a sampling method for the detection error of the output shaft encoder. As illustrated in FIG. 9, when the second rotation position information (second rotation angle group) with respect to the first rotation position information (first rotation angle group) for every 360 degrees of the input shaft encoder 201 is calculated, since the reduction gear ratio is 10:1, the number of samples of the output shaft encoder detection error is ten points. Next, as described in the flow charts of FIGS. 1A and 1B, the data obtained by sampling the output shaft encoder detection error is interpolated, and a correction table is generated on the basis of the interpolated information. FIG. 10 illustrates a linear interpolation of the sampling data of the output shaft encoder detection error. In FIG. 10, since the reduction gear ratio is 10:1, the linear interpolation is performed while the number of samples is set as ten points. However, as the reduction gear ratio is higher, the number of samples is further increased, and the waveform on which the linear interpolation has been performed is close to a shape of a sine wave. With regard to the correction table, performing the correction means performing a control of cancelling the encoder detection error, and therefore, such data that the interpolated waveform as illustrated in FIG. 10 is cancelled may be set in the correction table. The supplementary data drawn in the bottom part of FIG. 10 is generated from data corresponding to the first rotation position information (first rotation angle group) for every 360 degrees of the input shaft encoder 201. Therefore, even if an input shaft encoder has the encoder detection error caused by the eccentricity, the influence is suppressed to a low level as described above.

Subsequently, the detection error of the output shaft encoder is corrected by the second correction calculation unit 211 on the basis of the correction table (the correction table may be the supplementary data itself) to update the second position information generation unit 209, so that the correction of the output shaft encoder detection error is completed.

FIG. 11 illustrates the output shaft encoder detection errors before and after the correction. As illustrated in FIG. 11, an absolute value of the correction output shaft encoder detection error before the correction is 10 minutes. In contrast to this, an absolute value of the correction output shaft encoder detection error after the correction is 0.48 minutes, and it is therefore found that the detection error of the angle which is caused by the encoder detection error is improved.

Degrees of the improvement in the detection error of the angle which is caused by the encoder detection error will be collectively illustrated later.

In this manner, it is possible to correct the encoder detection error caused by the eccentricity of the parts constituting the encoder by using the angle detection method according to the present exemplary embodiment.

According to the present exemplary embodiment as described above by using FIG. 1A and FIG. 9, the descriptions have been given while the output shaft encoder detection error is corrected by using the rotation position information for every 360 degrees of the input shaft encoder 201 as the reference, but the configuration is not limited to this. For example, even when the number of samples is decreased by thinning out the sampling to reduce the amount of sampling data, since the reference of the rotation position information of the input shaft encoder 201 is constant, it is possible to correct the detection error of the output shaft encoder. In addition, by using the sampling interval of the rotation position information for every angles other than 360 degrees of the input shaft encoder 201, for example, the periodic rotation position information for every 180 angles, it is also possible to correct the output shaft encoder detection error.

As illustrated in FIG. 9, the descriptions have been given while the sampling initial phase of the input shaft encoder 201 is set as 270. However, since the relative detection error of the input/output shaft encoder can be calculated even when the sampling initial phase is arbitrary, the present invention can be carried out. As illustrated in FIG. 10, the descriptions have been given while the interpolation method for the sampling data is set as the linear interpolation, but a general sine wave estimation interpolation or the like in which a positive peak point, a negative peak point, and a zero cross point are picked up among the sampling data, and the sine wave is estimated from those points may also be used.

As described above, since the exemplary embodiment of the present invention attains the high correction effect for the encoder error, the exemplary embodiment can be appropriately applied to the control for positioning the output shaft at a high accuracy and the torsional feedback control to improve the accuracy for positioning the tip position of the robot arm.

In addition, a program for causing a computer to execute the respective procedures of the angle detection method according to the present exemplary embodiment may be created and used, and also a storage medium that records the program can also of course be used.

Second Exemplary Embodiment

According to a second exemplary embodiment, descriptions related to configurations similar to the first exemplary embodiment will be omitted, and only configurations different from the first exemplary embodiment will be described. According to the first exemplary embodiment, the descriptions have been given while the rotation position information for every 360 degrees of the input shaft encoder 201 is set as the reference to correct the output shaft encoder detection error. In contrast to this, according to the second exemplary embodiment, descriptions will be given while the rotation position information of the output shaft encoder 202 after the correction is set as the reference to correct an input shaft encoder detection error.

Figure 1B:
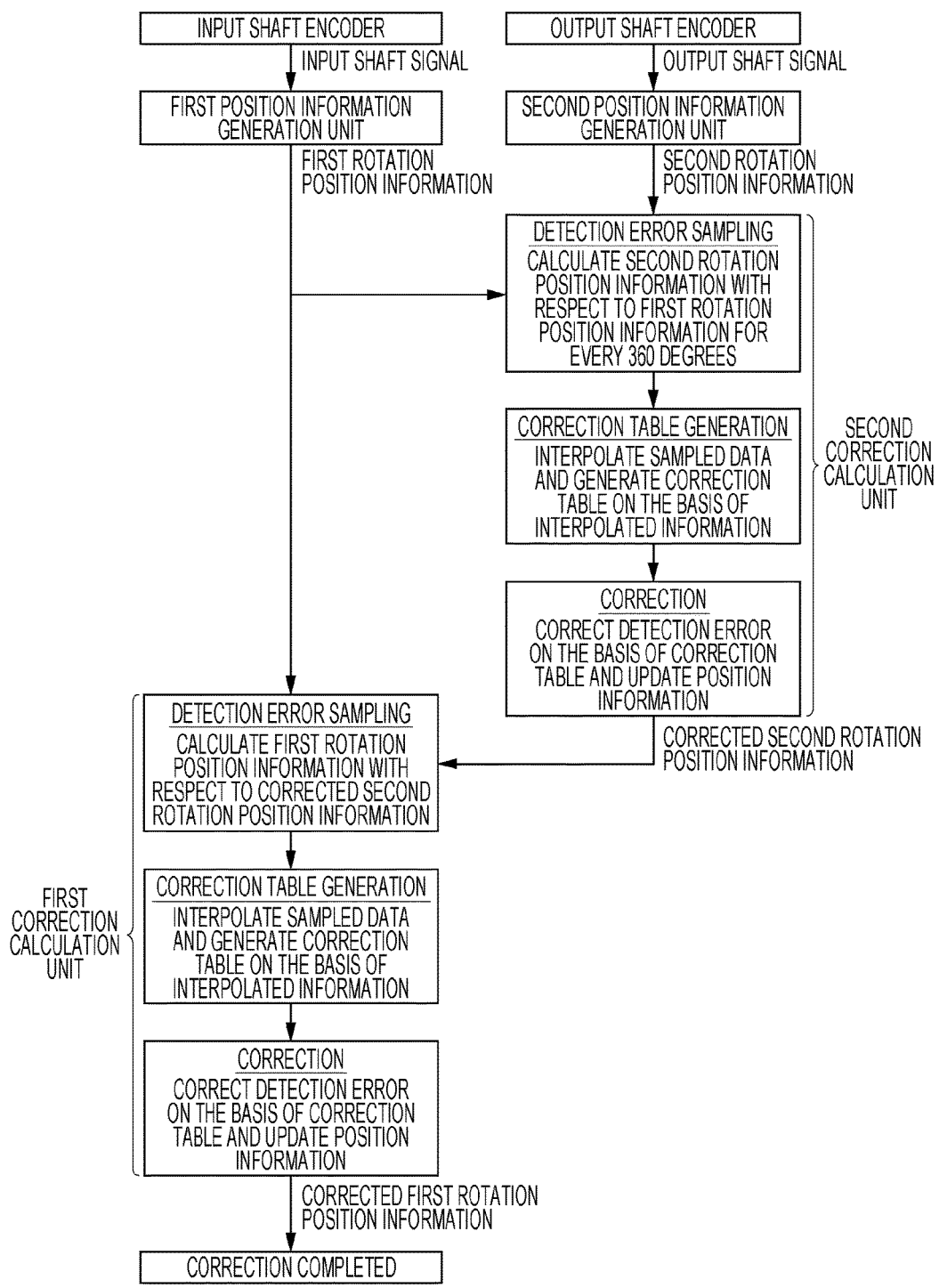

FIG. 1B is a flow chart illustrating the exchanges of the signals and the information in the angle detection method according to the present exemplary embodiment.

The first correction calculation unit 210 calculates the first rotation position information of the input shaft encoder 201 with respect to the second rotation position information of the output shaft encoder 202 after the correction. Since the second rotation position information of the output shaft encoder 202 after the correction (the corrected second rotation angle) is set as the reference, the detection error corresponding to the rotation position becomes constant. That is, in a case where the detection error of the input shaft encoder is corrected, the sampling interval for the detection error of the input shaft encoder may be arbitrary, and details of the calculation method other than the above are similar to the processing in the above-described second calculation unit.

Figure 13:
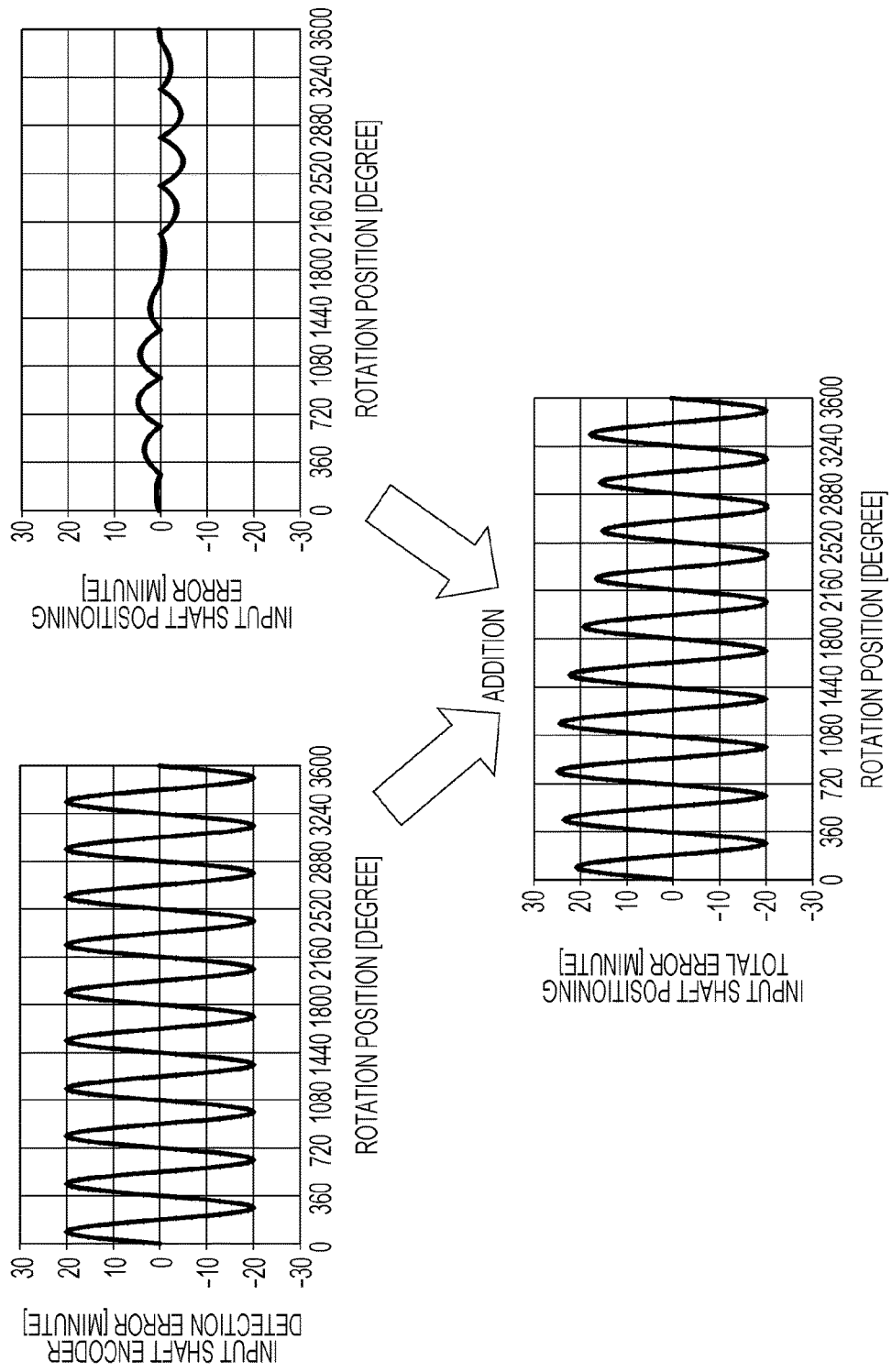
FIG. 13 illustrates an input shaft positioning total error caused by the input/output shaft encoder detection error.

FIG. 12 illustrates an input shaft positioning error caused by the correction output shaft encoder detection error after the correction. Since the reduction gear ratio of the reduction gear 204 is 10:1, a value obtained by dividing the absolute value of the correction output shaft encoder detection error after the correction (0.48 minutes) by the reduction gear ratio (1/10) becomes the absolute value of the input shaft positioning error (4.8 minutes) which is derived from the correction output shaft encoder detection error after the correction. FIG. 13 illustrates the input shaft positioning total error which is derived from the input/output shaft encoder detection error. FIG. 13 represents the addition of the input shaft encoder detection error in FIGS. 6A and 6B with the input shaft positioning error which is derived from the correction output shaft encoder detection error after the correction in FIG. 12. The input shaft positioning error which is derived from the correction output shaft encoder detection error after the correction at 4.8 minutes in the absolute value is added to the input shaft encoder detection error in one period of the sine wave at 20 minutes in the absolute value. For that reason, the input shaft positioning total error which is derived from the input/output shaft encoder detection error becomes a waveform having an error at maximum 24.8 minutes in the absolute value as illustrated in FIG. 13. FIG. 14 illustrates an input shaft encoder detection error after the correction. From FIG. 14, it is found that, whereas the absolute value of the correction input shaft encoder detection error before the correction is 20 minutes, the absolute value of the input shaft encoder detection error becomes 4.8 minutes, and the improvement is attained. According to this exemplary embodiment, an amount corresponding to an inverse number of the reduction gear ratio (1/10), that is, data corresponding to ten rotations is used as the correction table of the input shaft encoder 201.

As described above, since the exemplary embodiment of the present invention attains the high correction effect for the encoder error, the exemplary embodiment can be appropriately applied to the control for positioning the output shaft at a high accuracy and the torsional feedback control to improve the accuracy for positioning the tip position of the robot arm.

Third Exemplary Embodiment

Figure 16:
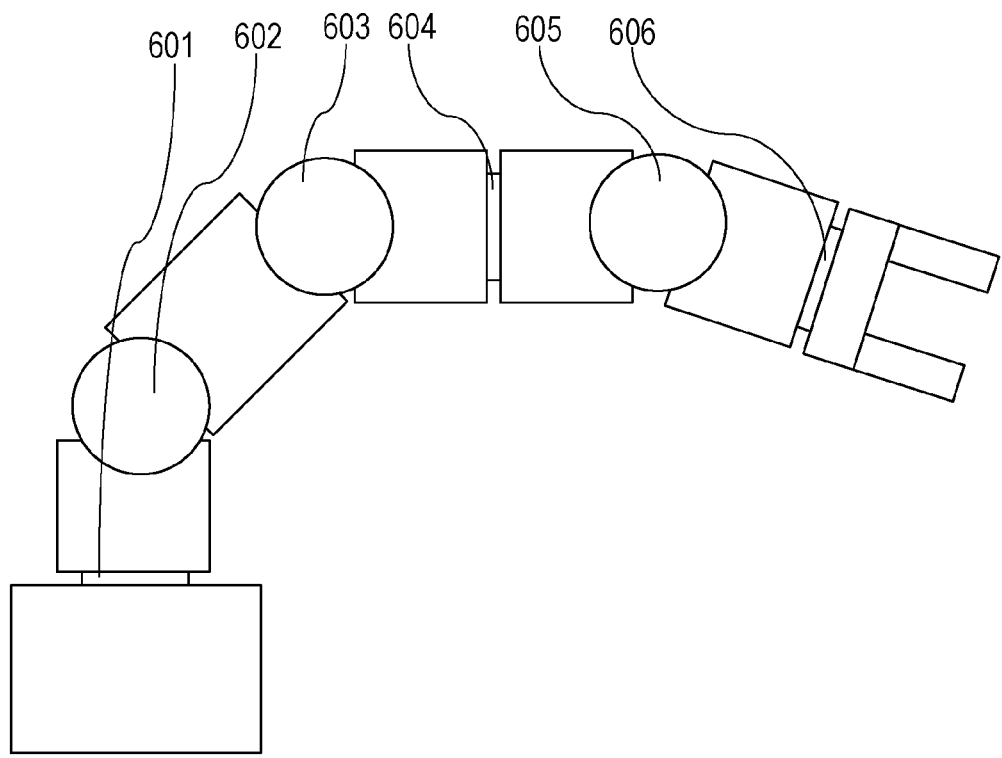
FIG. 16 illustrates a vertical articulated six-axis robot.

FIG. 16 illustrates a vertical articulated six-axis robot arm. In FIG. 16, first to sixth joints 601 to 606 are coupled to each other by links. FIG. 16 illustrates an example in which the above-described angle detection method is applied to the robot arm. It is however noted that the present invention is not limited to be applied to the vertical articulated six-axis robot. The angle detection apparatus according to the exemplary embodiment of the present invention is provided to at least one of the first to sixth joints 601 to 606 and is configured to detect the rotation angle from the reference angle at each of the joints of the robot arm. The motor and the angle detection apparatus constitute the rotation drive apparatus. A characteristic of the exemplary embodiment of the present invention resides in the robot arm having the joint parts and the joint part of the robot arm which is provided with the rotation drive apparatus.

In addition, another characteristic of the exemplary embodiment of the present invention resides in the robot arm including the angle detection apparatus provided with the control unit that stores the program for causing the computer to execute the respective procedures of the angle detection method according to the present exemplary embodiment. The control unit may be provided to the angle detection apparatus, and the control unit of the robot arm may also have the function as well.

Fourth Exemplary Embodiment

Figure 17:
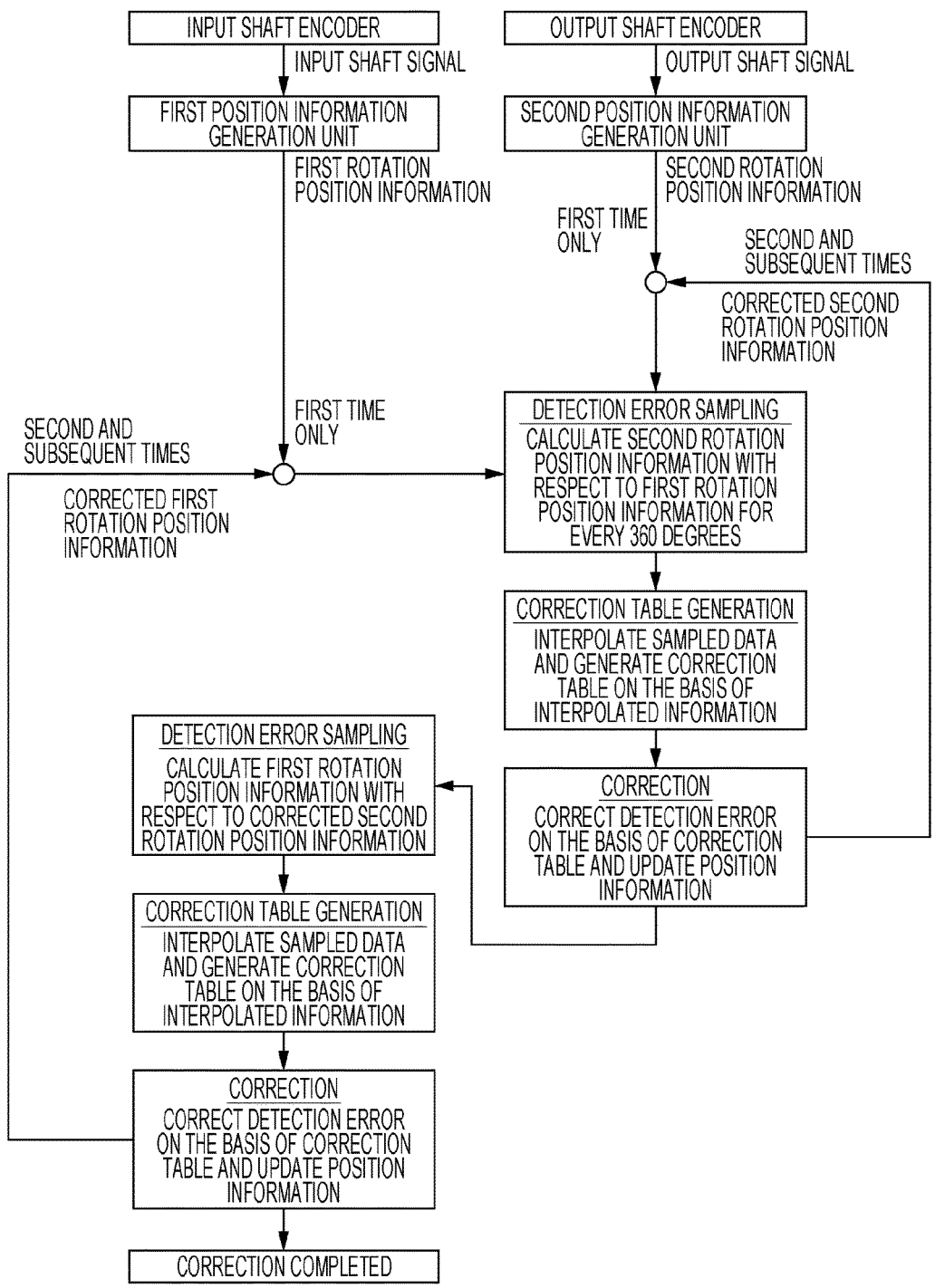
FIG. 17 is a flow chart when an encoder detection error correction is repeatedly performed.

According to a fourth exemplary embodiment, descriptions related to configurations similar to the second exemplary embodiment will be omitted, and only configurations different from the second exemplary embodiment will be described. According to the second exemplary embodiment, the descriptions have been given while the rotation position information for every 360 degrees of the input shaft encoder 201 is used as the reference to correct the output shaft encoder detection error, and the rotation position information of the output shaft encoder 202 after the correction is used as the reference to correct the input shaft encoder detection error. In contrast to this, according to the fourth exemplary embodiment, it is expected to further reduce the error by repeatedly performing the series of correction procedures of the second exemplary embodiment. FIG. 17 is a flow chart when the correction of the encoder detection error is repeatedly performed. As illustrated in FIG. 17, the encoder detection error is corrected in the first correction by using the first and second rotation position information output from the first and second position information generation units similarly as in the second exemplary embodiment. Subsequently, the encoder detection error is corrected in the second correction by using the first and second rotation position information after the correction corrected in the first correction. That is, the rotation position information of the input shaft encoder 201 after the correction is used as the reference to correct the correction output shaft encoder detection error after the correction again in the second correction.

Subsequently, the rotation position information of the output shaft encoder 202 which has been corrected again is used as the reference to correct the input shaft encoder detection error after the correction again. Herein, the number of corrections to be performed is not limited, and the corrections may be alternately repeatedly performed any number of times.

That is, a characteristic of the exemplary embodiment of the present invention resides in that the procedure of correcting the second rotation angle again after the correction for every periodic angles in the first angle rotation after the correction described above is repeated at least once or more times.

As described above, since the encoder detection error is repeatedly corrected by using the rotation position information after the correction, it is possible to enhance the correction effect.

Fifth Exemplary Embodiment

According to a fifth exemplary embodiment, descriptions related to configurations similar to the first and second exemplary embodiments will be omitted, and only configurations different from the first and second exemplary embodiments will be described. According to the first and second exemplary embodiments, the output shaft encoder 202 detects the rotation angle of the output shaft 206. In contrast to this, according to the fifth exemplary embodiment, a method is employed in which the output shaft encoder 202 detects the rotation angle of the input shaft 205, and a difference between the rotation angle of the input shaft 205 detected by the input shaft encoder 201 and the rotation angle of the input shaft 205 detected by the output shaft encoder 202 is calculated to obtain a rotation angle of the output shaft 206.

Figure 18:
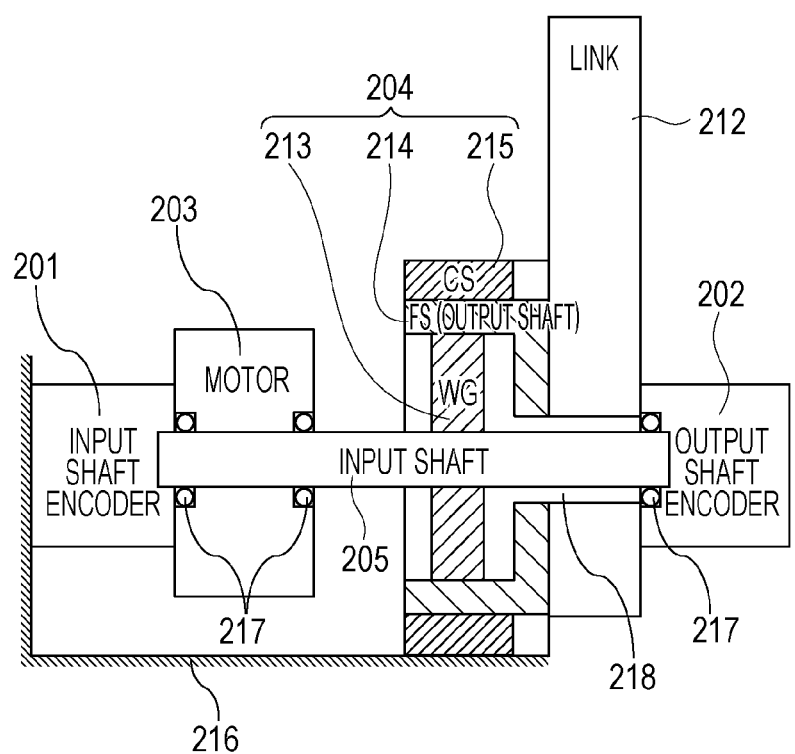
FIG. 18 is a cross sectional view of the rotation drive apparatus according to a fifth exemplary embodiment.

Next, the configuration of the rotation drive apparatus will be described. FIG. 18 is a block diagram of the rotation drive apparatus according to the fifth exemplary embodiment. A link 212 is connected to the output shaft 206 of the reduction gear 204, and the output shaft encoder 202 is coupled to the link 212. In addition, the link 212 is designed to have a hollow construction such that the rotation angle of the input shaft 205 can be detected by the output shaft encoder 202. With the above-described configuration, the output shaft encoder 202 can detect the rotation angle of the input shaft 205.

Next, a method of obtaining the rotation angle of the output shaft 206 will be specifically described. For example, in a case where the reduction gear ratio of the reduction gear 204 is 10:1, ten rotations (3600 degrees) of the input shaft 205 are to be performed to make one rotation of the output shaft 206 (360 degrees). When the input shaft 205 is caused to make ten rotations (3600 degrees), since the output shaft encoder 202 is coupled to the link 212, the output shaft encoder 202 itself makes one rotation (360 degrees). For that reason, in a case where the input shaft 205 and the output shaft 206 rotate in a same direction, the rotation angle detected by the output shaft encoder 202 is nine rotations (3240 degrees). Subsequently, when a difference between the rotation angle of 3600 degrees detected by the input shaft encoder 201 and the rotation angle of 3240 degrees detected by the output shaft encoder 202 is calculated, it is possible to obtain 360 degrees corresponding to the rotation angle of the output shaft 206.

Figure 20:
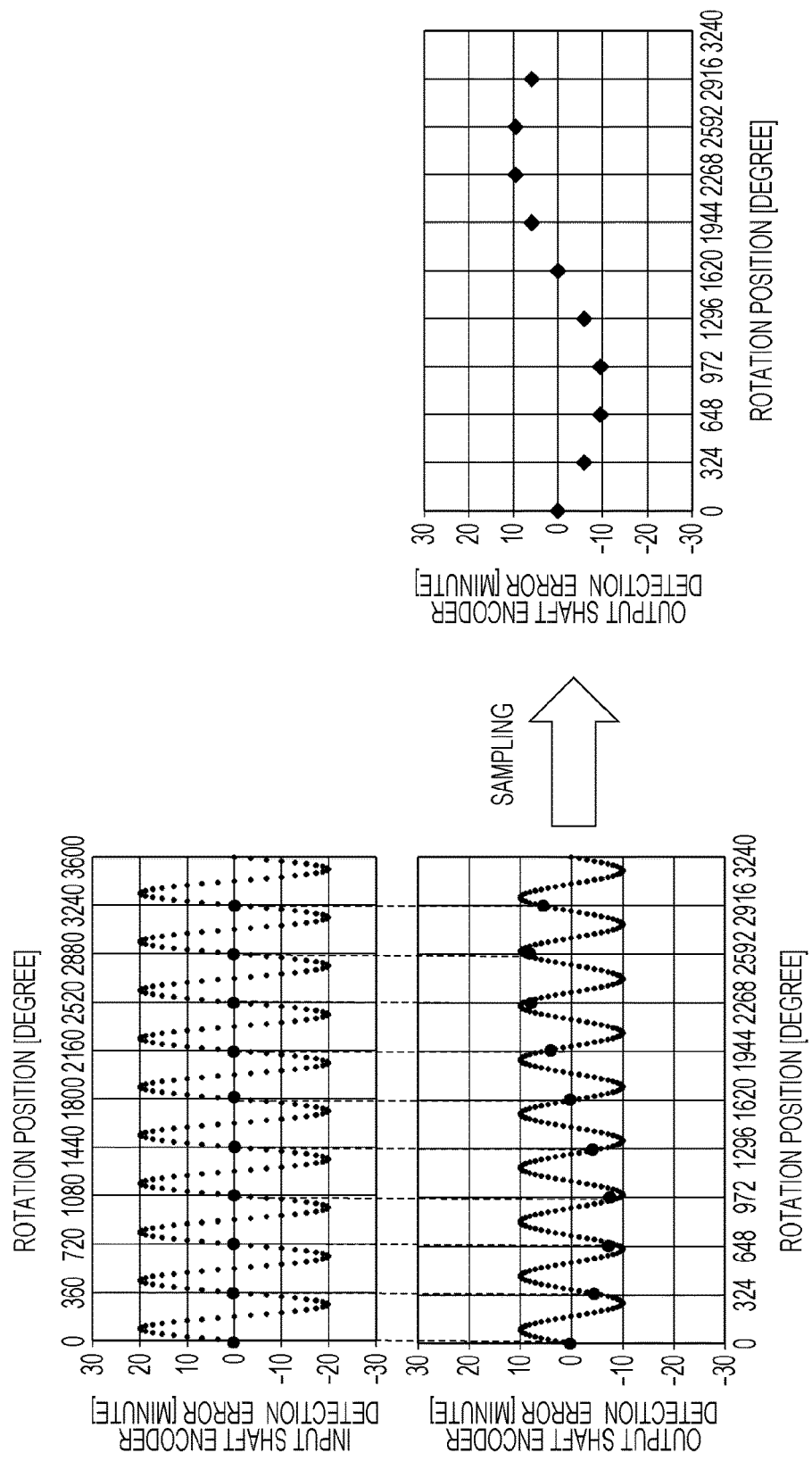
FIG. 20 illustrates a sampling method for the output shaft encoder detection error according to the fifth exemplary embodiment.

Next, a correction method for the encoder detection error will be described. FIG. 20 illustrates a sampling method for the output shaft encoder detection error according to the fifth exemplary embodiment. This is an example in a case where the output shaft 206 is caused to make one rotation (360 degrees) under conditions that the detection error of the input shaft encoder 201 is set as ±20 minutes, the detection error of the output shaft encoder 202 is set as ±10 minutes, and the reduction gear ratio of the reduction gear 204 is set as 10:1. In this case, it is indicated that the sinusoidal detection error by an amount corresponding to ten periods appears since the input shaft encoder 201 makes ten rotations, and the sinusoidal detection error by an amount corresponding to nine periods appears since the output shaft encoder 202 makes nine rotations. The number of samples of the detection error of the output shaft encoder 202 obtained by setting the rotation angle for every 360 degrees of the input shaft encoder 201 as the reference is ten points since the sine wave of the input shaft encoder 201 corresponds to 10 periods.

FIG. 21 illustrates the sine wave estimation interpolation for the sampling data of the output shaft encoder detection error according to the fifth exemplary embodiment. Since the sampling data of the output shaft encoder 202 corresponds to ten points, and a highest value, a lowest value, and a rotation position interval (sampling frequency) can be obtained from among the samples, it is possible to estimate the sine wave as illustrated in FIG. 21. FIG. 22 illustrates the correction output shaft encoder detection error after the correction according to the fifth exemplary embodiment. In FIG. 22, a difference between the detection error of the output shaft encoder 202 before the correction and the correction amount after the sine wave estimation supplement is set as the detection error of the output shaft encoder 202 after the correction. With regard to the correction effect, since the absolute value of ±0.49 minutes of the detection error of the output shaft encoder 202 after the correction is obtained with respect to the absolute value of ±10 minutes of the detection error of the output shaft encoder 202 before the correction, the correction effect at 97.6% is attained.

Figure 19:
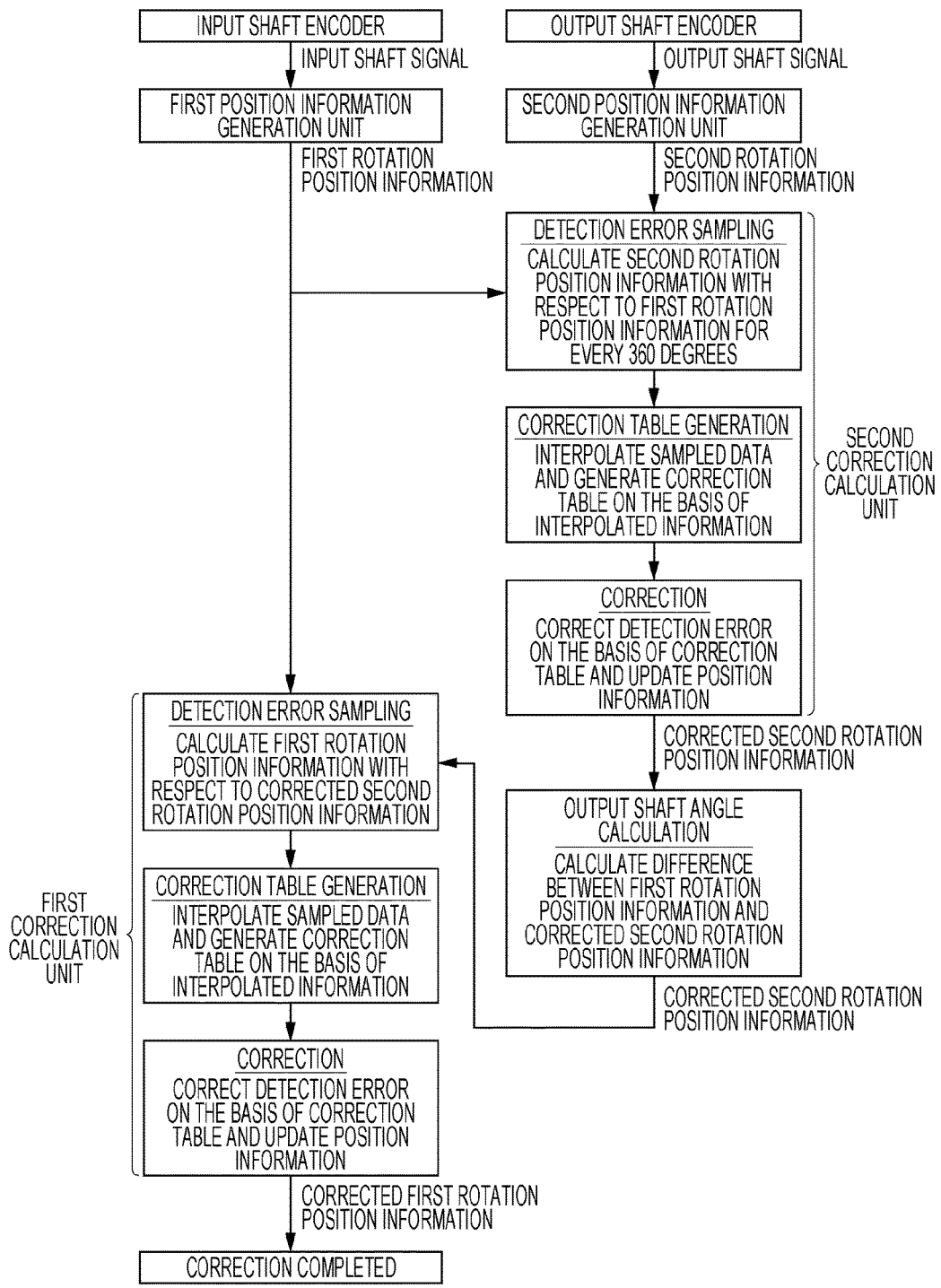
FIG. 19 is a flow chart of an encoder detection error correction method according to the fifth exemplary embodiment.

FIG. 19 is a flow chart of an encoder detection error correction method according to the fifth exemplary embodiment. As illustrated in FIG. 19, the output shaft encoder 202 transmits the input shaft signal to the second position information generation unit 209. In addition, an output shaft angle calculation procedure of calculating a difference between the first rotation position information and the corrected second rotation position information is added in the second correction calculation unit 211. The other flows are similar to those of the first and second exemplary embodiments, and it is possible to correct the detection error of the input shaft encoder 201 by calculating the first rotation position information with respect to the corrected second rotation position information.

Herein, a difference between the present exemplary embodiment and the first and second exemplary embodiments will be described. According to the first and second exemplary embodiments, for example, in a case where the configuration of the rotation drive apparatus is applied to a multi-axis robot arm, a fixed base 216 common to the input shaft encoder 201 is to be used as a unit that fixes the output shaft encoder 202. However, when the above-described configuration is adopted, the output shaft 206 does not perform indefinite rotations, and also, the size of the rotation drive apparatus is also increased. In contrast to this, according to the fifth exemplary embodiment, in a case where the configuration of the rotation drive apparatus is applied to the multi-axis robot arm, since the configuration where the output shaft encoder 202 is connected to the link 212 is adopted, the link 212 can perform indefinite rotations, and also it is possible to decrease the size of the rotation drive apparatus.

As described above, according to the fifth exemplary embodiment too, it is possible to reduce the detection errors of the input shaft encoder and the output shaft encoder by using the correction method of the present invention.

Comparison Example 1

Figure 6A:
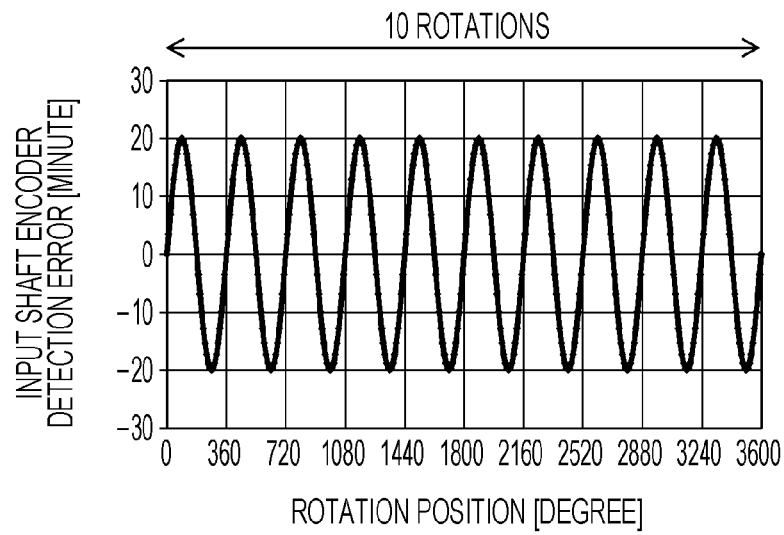
FIGS. 6A and 6B illustrate a relationship between input/output shaft encoder detection errors at a reduction gear ratio of 10:1.
Figure 6B:
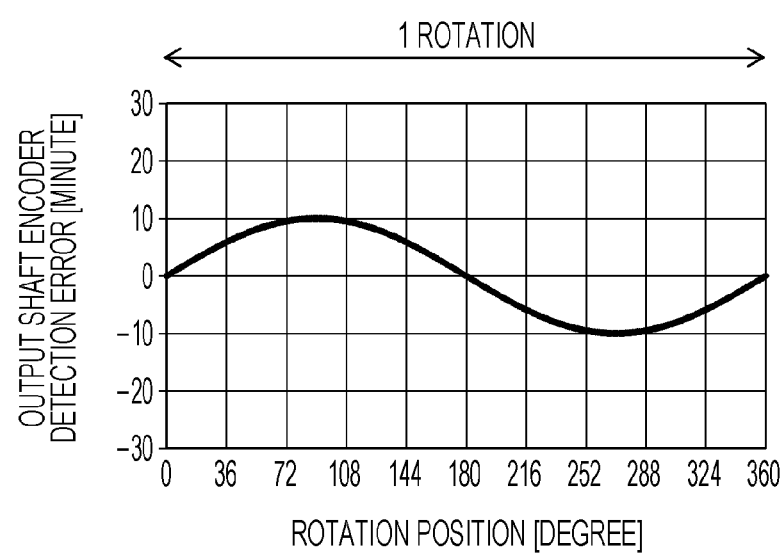
Figure 8:
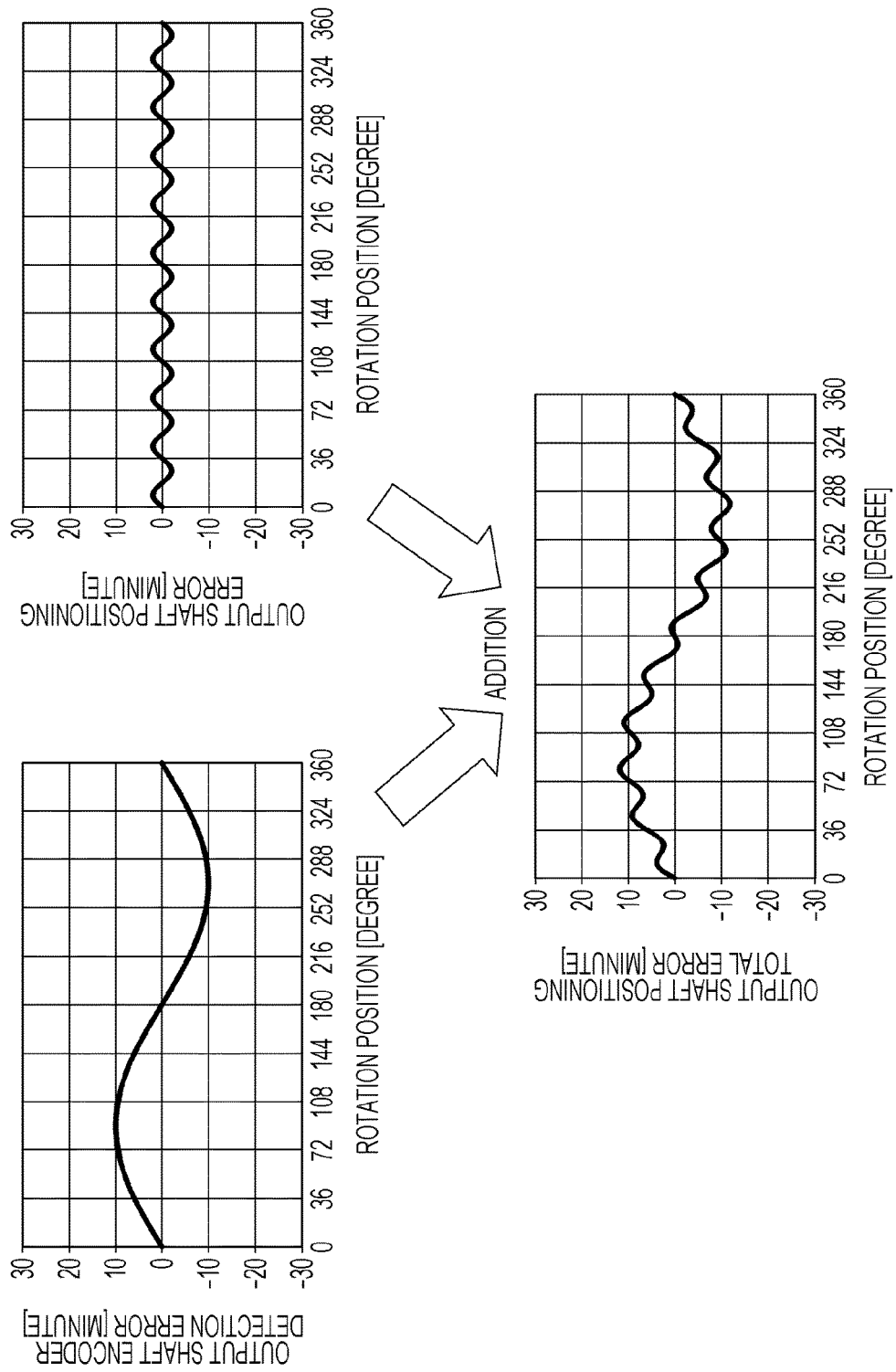
FIG. 8 illustrates an output shaft positioning total error caused by the input/output shaft encoder detection errors.

Here, a correction method for the encoder detection error based on the related art technology (Japanese Patent Laid-Open No. 2012-137310 described above) will be described in detail by using the drawings. First, descriptions will be given of FIGS. 6A and 6B, FIG. 7, and FIG. 8. FIGS. 6A and 6B illustrate an input/output shaft encoder detection error at the reduction gear ratio of 10:1. This is an example in a case where the reduction gear ratio is 10:1, the absolute value of the input shaft encoder detection error is 20 minutes, and the absolute value of the output shaft encoder detection error is 10 minutes. Since the reduction gear ratio is 10:1, when the input shaft of the input shaft encoder makes ten rotations (3600 degrees), the output shaft of the output shaft encoder makes one rotation (360 degrees). That is, to obtain an amount corresponding to one period of the sinusoidal output shaft encoder detection error, the shaft of the input shaft encoder is caused to make rotations corresponding to the inverse number (10) of the reduction gear ratio (1/10). FIG. 7 illustrates the output shaft positioning error derived from the input shaft encoder detection error. This is the drawing illustrating that the input shaft encoder detection error of FIGS. 6A and 6B is subjected to an output shaft conversion. Since the reduction gear ratio is 10:1, a value obtained by multiplying the absolute value of the input shaft encoder detection error (20 minutes) by the reduction gear ratio (1/10) becomes the absolute value (2 minutes) of the output shaft positioning error derived from the input shaft encoder detection error. FIG. 8 illustrates the output shaft positioning total error derived from the input/output shaft encoder detection error. This is the drawing illustrating that the output shaft encoder detection error of FIGS. 6A and 6B is added with the output shaft positioning error derived from the input shaft encoder detection error of FIG. 7. This indicates that the output shaft positioning error derived from the input shaft encoder detection error having ten periods of the sine wave with the absolute value of 2 minutes is added to the output shaft encoder detection error having one period of the sine wave with the absolute value of 10 minutes. For that reason, the output shaft positioning total error derived from the input/output shaft encoder detection error has a waveform involving an error with the absolute value of 12 minutes.

According to the related art technology, since the output shaft encoder detection error is to be corrected while the rotation position information of the input shaft encoder is set as the reference, the output shaft positioning error derived from the input shaft encoder detection error as illustrated in FIG. 7 is generated. That is, in actuality, the output shaft encoder detection error only having one period of the sine wave with the absolute value of 10 minutes as illustrated in FIGS. 6A and 6B looks like the waveform having the error with the absolute value of 12 minutes as illustrated in FIG. 8. For that reason, this output shaft positioning error affects the influence on the correction of the output shaft encoder detection error, and the output shaft positioning error derived from the input shaft encoder detection error remains as the output shaft encoder detection error, and it is found that the correction effect is decreased.

To summarize, FIG. 15 illustrates correction simulation results for comparing the present invention with the related art technology (Comparison Example 1). It is assumed as a prerequisite that the input/output shaft encoder detection error before the correction is an ideal sine wave. In addition, the reduction gear ratio is set as 10:1 and 50:1, the absolute value of the output shaft encoder detection error is set as ±10 minutes and ±5 minutes, and the absolute value of the input shaft encoder detection error is set as ±20 minutes as parameters. From FIG. 15, a condition A represents the above-described example. A condition B represents a case where the reduction gear ratio is changed from 10:1 to 50:1 with respect to the condition A. A condition C represents a case where the output shaft encoder detection error is changed from 10 minutes to 5 minutes with respect to the condition B. From FIG. 15, it may be obvious that the correction effect is larger in the present invention than the related art technology in all the conditions. Two characteristics are noted as the correction effect of the present invention. The first characteristic is that the correction effect of the input/output shaft encoder detection error is larger as the reduction gear ratio is higher. This is because the number of samples of the output shaft encoder detection error is increased as the reduction gear ratio is higher, and the waveform on which the linear interpolation has been performed has a shape closer to the sine wave. The second characteristic is that the effect of the present invention is larger with respect to the related art technology as the ratio of the input shaft encoder detection error to the output shaft encoder detection error is higher. This is because, according to the related art technology, since the output shaft positioning error derived from the input shaft encoder detection error is generated as the corrected result as described above, the influence of the input shaft encoder detection error is increased as the output shaft encoder detection error is smaller.

In this manner, it is possible to correct the encoder detection error while achieving a larger effect than the related art technology by using the correction method according to the present invention.

From the above-described descriptions, according to the present invention, since the correction effect of the encoder detection error is large, and it is possible to detect the input/output shaft positions at a high accuracy, it is found that the control for positioning the output shaft at a high accuracy and the torsional feedback control to improve the accuracy for positioning the tip position of the robot arm can be performed.

According to the present invention, the detection error of the output shaft encoder (second encoder) is corrected while the rotation position information using the periodicity of the rotations of the input shaft encoder (first encoder) is set as the reference. For that reason, even in a case where the encoder detection error exists in the input shaft encoder, it is possible to appropriately control the robot arm.

In addition, since the above-described high-accuracy correction can be performed even when an inexpensive encoder involving an encoder detection error is provided to the input/output shaft of the robot arm, it is possible to achieve the high positioning accuracy without providing an additional structural part.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-067097, filed Mar. 27, 2014, which is hereby incorporated by reference herein in its entirety.

What is claimed is:

1. An angle correcting method performed by an apparatus provided with a first shaft, a power transmission unit, and a second shaft which are connected, and also provided with a first encoder for obtaining a first rotation angle of the first shaft and a second encoder for obtaining a second rotation angle of the second shaft, the angle correcting method comprising:
  obtaining first rotation angle data from the first encoder, wherein the first rotation angle data indicates a plurality of rotation angles of the first shaft that were detected by the first encoder;
  obtaining second rotation angle data from the second encoder, wherein the second rotation angle data indicates a plurality of rotation angles of the second shaft that were detected by the second encoder;
  generating correction data for the second encoder by interpolating sampling points of a detection error of the second encoder, wherein each of the sampling points of the detection error indicates a difference between a rotation angle detected by the second encoder and a physical rotation angle of the second shaft, and wherein the interpolating is performed by linear interpolation or sine wave estimation interpolation using the sampling points of the detection error; and
  obtaining corrected second rotation angle data by correcting the second rotation angle data using the correction data for the second encoder.

2. The angle correcting method according to claim 1, wherein the sampling points of the detection error correspond to respective rotation angles of the first shaft in the plurality of rotation angles of the first shaft.

3. The angle correcting method according to claim 2, wherein the respective rotation angles of the first shaft in the plurality of rotation angles of the first shaft that correspond to the sampling points of the detection error are separated from each other by increments of 180 degrees or 360 degrees.

4. The angle correcting method according to claim 2, wherein a plot of the correction data versus the rotation angles of the second shaft in the plurality of rotation angles of the second shaft has a sine-wave-like shape.

5. The angle correcting method according to claim 1, wherein the correction data is a table that associates rotation angles detected by the second encoder with respective detection errors.

6. The angle correcting method according to claim 1, further comprising:
  adjusting an output of a motor based on the corrected second rotation angle data.

7. The angle correcting method according to claim 1, further comprising:
  generating correction data for the first encoder based on the correction data for the second encoder, wherein the correction data for the first encoder indicates differences between rotation angles detected by the first encoder and respective rotation angles of the first encoder.

8. The angle correcting method according to claim 7, further comprising:
  obtaining corrected first rotation angle data by correcting the first rotation angle data using the correction data for the first encoder.

9. The angle correcting method according to claim 8, further comprising:
  adjusting an output of a motor based on the corrected second rotation angle data and on the corrected first rotation angle data.

10. An apparatus comprising:
  a first shaft, a power transmission unit, and a second shaft which are connected in succession;
  a first encoder that detects rotation angles of the first shaft;
  a second encoder that detects rotation angles of the second shaft; and
  a control unit configured to
  obtain first rotation angle data from the first encoder, wherein the first rotation angle data indicates a plurality of rotation angles of the first shaft that were detected by the first encoder;
  obtain second rotation angle data from the second encoder, wherein the second rotation angle data indicates a plurality of rotation angles of the second shaft that were detected by the second encoder;
  generate correction data for the second encoder by interpolating sampling points of a detection error of the second encoder, wherein each of the sampling points of the detection error indicates a difference between a rotation angle detected by the second encoder and a physical rotation angle of the second shaft; and
  obtain corrected second rotation angle data by correcting the second rotation angle data using the correction data for the second encoder.

11. The apparatus according to claim 10, further comprising:
  a motor,
  wherein the control unit is further configured to adjust an output of the motor based on the corrected second rotation angle data.

12. The apparatus according to claim 11, further comprising:
  a robot arm including a joint part, wherein the motor drives the robot arm at the joint part.

13. The apparatus according to claim 11, wherein the control unit is further configured to generate correction data for the first encoder based on the correction data for the second encoder, wherein the correction data for the first encoder indicates differences between rotation angles detected by the first encoder and respective rotation angles of the first shaft.

14. The apparatus according to claim 13, wherein the control unit is further configured to generate corrected first rotation angle data by correcting the first rotation angle data using the correction data for the first encoder.

15. The apparatus according to claim 14, wherein the control unit is further configured to adjust the output of the motor further based on the corrected first rotation angle data.

16. The apparatus according to claim 15, wherein the first shaft, the power transmission unit, and the second shaft are configured such that the second shaft rotates at least twice for every one rotation of the first shaft.

* * * * *